(12) United States Patent
Bhan et al.

(10) Patent No.: US 8,372,777 B2
(45) Date of Patent: Feb. 12, 2013

(54) CATALYSTS, PREPARATION OF SUCH CATALYSTS, METHODS OF USING SUCH CATALYSTS, PRODUCTS OBTAINED IN SUCH METHODS AND USES OF PRODUCTS OBTAINED

(75) Inventors: Opinder Kishan Bhan, Katy, TX (US); Scott Lee Wellington, Bellaire, TX (US)

(73) Assignee: Shell Oil Company, Houston, TX (US)

( * ) Notice: Subject to any disclaimer, the term of this patent is extended or adjusted under 35 U.S.C. 154(b) by 0 days.

(21) Appl. No.: 13/426,802

(22) Filed: Mar. 22, 2012

(65) Prior Publication Data
US 2012/0175285 A1    Jul. 12, 2012

Related U.S. Application Data

(62) Division of application No. 12/421,771, filed on Apr. 10, 2009, now Pat. No. 8,178,468.

(60) Provisional application No. 61/043,941, filed on Apr. 10, 2008.

(51) Int. Cl.
| | |
|---|---|
| C10L 1/00 | (2006.01) |
| C10L 1/04 | (2006.01) |
| C10L 1/06 | (2006.01) |
| C10L 1/16 | (2006.01) |
| C10L 5/00 | (2006.01) |
| H01B 3/22 | (2006.01) |
| C10G 31/11 | (2006.01) |
| C10G 71/00 | (2006.01) |
| C10C 1/00 | (2006.01) |
| C10C 3/00 | (2006.01) |
| C10C 3/06 | (2006.01) |
| B01J 29/70 | (2006.01) |
| C07C 7/20 | (2006.01) |
| C10M 101/02 | (2006.01) |
| C10M 105/02 | (2006.01) |
| C10M 107/00 | (2006.01) |
| C10M 109/00 | (2006.01) |
| C10M 111/00 | (2006.01) |
| C10M 115/02 | (2006.01) |
| C10M 119/00 | (2006.01) |
| C10M 121/00 | (2006.01) |
| C10M 127/00 | (2006.01) |
| C10M 143/00 | (2006.01) |
| C10M 159/00 | (2006.01) |
| C10M 165/00 | (2006.01) |
| C10M 167/00 | (2006.01) |
| C10M 169/00 | (2006.01) |
| C10M 171/00 | (2006.01) |

(52) U.S. Cl. ........ 502/305; 502/240; 502/254; 502/255; 502/256; 502/263; 502/319; 502/321; 502/322; 502/323; 208/14; 208/15; 208/18; 208/40; 208/41; 208/46; 208/308; 44/300; 44/628; 585/1; 585/14

(58) Field of Classification Search .................. 502/240, 502/254–256, 263, 305, 319, 321–323; 208/14, 208/15, 18, 40, 41, 46, 308; 44/300, 628; 585/1, 14
See application file for complete search history.

(56) References Cited

U.S. PATENT DOCUMENTS

| | | | | |
|---|---|---|---|---|
| 4,257,922 A * | 3/1981 | Kim et al. | ..................... | 502/315 |
| 4,414,102 A * | 11/1983 | Rankel et al. | ................. | 208/211 |
| 4,514,279 A * | 4/1985 | Mahoney et al. | ............. | 208/421 |
| 4,520,128 A * | 5/1985 | Morales et al. | ............... | 502/210 |
| 4,900,711 A * | 2/1990 | Nebesh et al. | ................ | 502/228 |
| 5,210,061 A * | 5/1993 | Simpson et al. | ............... | 502/254 |
| 5,827,421 A * | 10/1998 | Sherwood, Jr. | ................ | 208/112 |
| 5,888,380 A * | 3/1999 | Fujita et al. | ............. | 208/251 H |
| 7,745,369 B2 * | 6/2010 | Bhan et al. | ..................... | 502/246 |
| 8,178,468 B2 * | 5/2012 | Bhan et al. | ..................... | 502/305 |
| 8,318,000 B2 * | 11/2012 | Bhan et al. | ....................... | 208/14 |
| 2005/0167324 A1* | 8/2005 | Bhan et al. | ..................... | 208/115 |
| 2012/0111765 A1* | 5/2012 | Bhan et al. | ....................... | 208/15 |

FOREIGN PATENT DOCUMENTS

| | | | |
|---|---|---|---|
| WO | WO 2008016969 A2 | * | 2/2008 |
| WO | 2009/126909 | * | 10/2009 |
| WO | 2009/135227 | * | 11/2009 |

OTHER PUBLICATIONS

"Alumina-silica binary mixed oxide used as support of catalysts for hydrotreating of Maya heavy crude," S. K. Maity et al. Applied Catalysis A: General 250 (2003), pp. 231-238.*

"Surface characterization of Al2O3-SiO2 supported NiMo catalysts: An effect of support composition," Carolina Leyva et al. Catalysis Today 130 (2008), pp. 345-353.*

* cited by examiner

*Primary Examiner* — Patricia L Hailey

(57) ABSTRACT

Method of contacting a hydrocarbon feed with a catalyst that includes one or more metals from Column 6 of the Periodic Table and/or one or more compounds of one or more metals from Column 6 of the Periodic Table and a support. The support comprises from 0.01 grams to 0.2 gram of silica and from 0.80 grams to 0.99 grams of alumina per gram of support. The catalyst has a surface area of at least 340 $m^2/g$, a pore size distribution with a median pore diameter of at most 100 Å, and at least 80% of its pore volume in pores having a pore diameter of at most 300 Å or the catalyst exhibits one or more peaks between 35 degrees and 70 degrees, and at least one of the peaks has a base width of at least 10 degrees, as determined by x-ray diffraction at 2-theta.

7 Claims, 3 Drawing Sheets

CATALYSTS, PREPARATION OF SUCH CATALYSTS, METHODS OF USING SUCH CATALYSTS, PRODUCTS OBTAINED IN SUCH METHODS AND USES OF PRODUCTS OBTAINED

This patent application claims the benefit of priority of U.S. patent application Ser. No. 12/421,771 filed Apr. 10, 2009, (now U.S. Pat. No. 8,178,468), which claims the benefit of priority of U.S. Provisional Application 61/043,941, filed Apr. 10, 2008.

FIELD OF THE INVENTION

The present invention relates to catalysts, preparation of such catalysts, methods using such catalysts, products obtained in such methods and uses of products obtained.

BACKGROUND OF THE INVENTION

Crudes (whether in the form of crude oils, or solid or semi-solid hydrocarbons such as bitumen) that have one or more unsuitable properties that do not allow the crudes to be economically transported, or processed using conventional facilities, are commonly referred to as "disadvantaged crudes". Disadvantaged crudes may have a high viscosity that renders the disadvantaged crude undesirable for conventional transportation and/or treatment facilities. Disadvantaged crudes having high viscosities, additionally, may also include hydrogen deficient hydrocarbons. When processing disadvantaged crudes having hydrogen deficient hydrocarbons, consistent quantities of hydrogen may need to be added to inhibit coke formation, particularly if elevated temperatures and high pressure are used to process the disadvantaged crude. Hydrogen, however, is costly to produce and/or costly to transport to treatment facilities.

Conventional methods of reducing the high viscosity of the disadvantaged crude include contacting the disadvantaged crude at elevated temperatures and pressure with hydrogen in the presence of a catalyst. Deposits formed during processing may accumulate in the larger pores of the catalyst while viscosity and/or other properties are reduced by contact of the feed with the active metals in the smaller pores of the catalyst that the deposits and/or large compounds contributing to viscosity can not enter. Disadvantages of conventional catalysts are that they require significant amounts of hydrogen in order to process the hydrogen deficient hydrogens and the larger pores of the catalyst become filled. Thus, the activity of the catalyst is diminished and the life of the catalyst is reduced.

It would be desirable to have a method and/or a catalyst for reducing the viscosity of disadvantaged crudes at elevated temperatures and minimal pressures for a prolonged period of time.

U.S. Pat. Nos. 6,554,994 to Reynolds et al., 6,436,280 to Harle et al., 5,928,501 to Sudhakar et al., 4,937,222 to Angevine et al., 4,886,594 to Miller, 4,746,419 to Peck et al., 4,548,710 to Simpson, 4,525,472 to Morales et al., 4,499,203 to Toulhoat et al., 4,389,301 to Dahlberg et al., and 4,191,636 to Fukui et al. describe various processes, systems, and catalysts for processing crudes and/or disadvantaged crudes.

U.S. Published Patent Application Nos. 20050133414 through 20050133418 to Bhan et al.; 20050139518 through 20050139522 to Bhan et al., 20050145543 to Bhan et al., 20050150818 to Bhan et al., 20050155908 to Bhan et al., 20050167320 to Bhan et al., 20050167324 through 20050167332 to Bhan et al., 20050173301 through 20050173303 to Bhan et al., 20060060510 to Bhan; 20060231465 to Bhan; 20060231456 to Bhan; 20060234876 to Bhan; 20060231457 to Bhan and 20060234877 to Bhan; 20070000810 to Bhan et al.; 20070000808 to Bhan; 20070000811 to Bhan et al.; International Publication Nos. WO 2008/016969 and WO 2008/106979 to Bhan; and U.S. patent application Ser. Nos. 11/866,909; 11/866,916; 11/866, 921 through 11/866,923; 11/866,926; 11/866,929 and 11/855,932 to Bhan et al., filed Oct. 3, 2007, are related patent applications and describe various processes, systems, and catalysts for processing crudes and/or disadvantaged crudes.

U.S. patent application Ser. No. 11/866,926 describes in Example 24 a catalyst that includes 0.02 grams of silica-alumina and 0.98 grams of alumina per gram of support, nickel and molybdenum. The catalyst has a median pore diameter of 155 Å, with at least 60% of the total number of pores in the pore size distribution having a pore diameter within 28 Å of the median pore diameter and a surface area of 179 $m^2/g$. Contact of a hydrocarbon feed with the catalyst and hydrogen at a temperature of 410° C. and a pressure of 3.8 MPa produces a crude product that has a reduced viscosity as compared to the hydrocarbon feed with a hydrogen consumption of 35 $Nm^3/m^3$. The distribution of pores in the pore volume of the catalyst is not discussed in Example 24. In Example 26, the catalyst includes an alumina support, alumina oxide fines, and molybdenum metal. The catalyst has a median pore diameter of 117 Å and a bimodal distribution of pore diameter size of pores in the pore volume. Contact of the hydrocarbon feed at 400° C. and 3.8 MPa produces a crude product that has a reduced viscosity. Hydrogen consumption was not discussed for the process using the catalyst of Example 26.

International Publication Nos. WO 2008/016969 and WO 2008/106979 to Bhan describe catalysts and methods of using the catalyst to produce hydrocarbon products having reduced pitch, sulfur, and MCR as compared to the initial hydrocarbon feed. The catalysts described in Examples I and III include a support having 2% silica in 98% alumina, and catalytically active metals molybdenum and nickel. The catalysts have median pore diameters of less than 100 Å and surface areas ranging from 133.5 $m^2/g$ to 332 $m^2/g$. The hydrocarbon products produced by contact of a heavy hydrocarbon with the catalysts at temperatures of 400° C. and pressures of 1900 psig (about 13 MPa) have reduced pitch and sulfur content as compared to the initial hydrocarbon feed. These publications do not discuss reduction of viscosity at minimal pressures with minimal hydrogen consumption.

It would be advantageous to be able to convert a hydrocarbon feed having a high viscosity, and therefore a low economic value, into a crude product having a decreased viscosity by contacting the hydrocarbon feed with minimal hydrogen consumption. The resulting crude product may, thereafter, be converted to selected hydrocarbon products using conventional hydrotreating catalysts.

In addition it would be advantageous to have a catalyst for carrying out the conversion of the hydrocarbon feed with a long useful life.

SUMMARY OF THE INVENTION

It has now been found that a hydrocarbon feed having a high viscosity can be converted into a crude product having a decreased viscosity with minimal hydrogen consumption by using a specific high surface area catalyst. In addition it has been found that such a high surface area catalyst has an increased useful life.

Accordingly, in some embodiments, the invention provides a catalyst comprising:

one or more metals from Column 6 of the Periodic Table and/or one or more compounds of one or more metals from Column 6 of the Periodic Table and a support; wherein the support comprises from 0.01 grams to 0.2 gram of silica and from 0.80 grams to 0.99 grams of alumina per gram of support, and wherein the catalyst has a surface area of at least 340 $m^2/g$, a pore size distribution with a median pore diameter of at most 100 Å, and at least 80% of its pore volume in pores having a pore diameter of at most 300 Å.

Further, in some embodiments, the invention provides a catalyst comprising:

one or more metals from Column 6 of the Periodic Table and/or one or more compounds of one or more metals from Column 6 of the Periodic Table and a support; wherein the support comprises from 0.01 grams to 0.2 gram of silica and from 0.80 grams to 0.99 grams of alumina per gram of support, and wherein the catalyst exhibits one or more peaks between 35 degrees and 70 degrees, as determined by x-ray diffracton at 2-theta, and at least one of the peaks has a base width of at least 10 degrees.

Further, in some embodiments, the invention provides a method of making a catalyst comprising:

co-mulling one or more metals from Column 6 of the Periodic Table and/or one or more compounds of one or more metals from Column 6 of the Periodic Table with a support to provide a metal/support composition, wherein the support comprises from 0.01 grams to 0.2 gram of silica and from 0.8 grams to 0.99 grams of alumina per gram of support; and calcining the metal/support composition at a temperature from 315° C. to 760° C. to provide a calcined catalyst having a surface area of at least 340 $m^2/g$, a pore size distribution with a median pore diameter of at most 100 Å, and at least 80% of its pore volume in pores having a pore diameter of at most 300 Å, wherein surface area is as determined by ASTM Method D3663 and pore diameters and pore volumes are as measured by ASTM Method D4284.

Further, in some embodiments, the invention provides a method of making a catalyst comprising:

co-mulling one or more metals from Column 6 of the Periodic Table and/or one or more compounds of one or more metals from Column 6 of the Periodic Table with a support to provide a metal/support composition, wherein the support comprises from 0.01 grams to 0.2 gram of silica and from 0.8 grams to 0.99 grams of alumina per gram of support; and calcining the metal/support composition at a temperature from 315° C. to 760° C. to provide a calcined catalyst, wherein the Column 6 metal catalyst exhibits one or more peaks between 35 degrees and 70 degrees, as determined by x-ray diffraction at 2-theta, and at least one of the peaks has a base width of at least 10 degrees.

Further, in some embodiments, the invention provides a method of producing a crude product, comprising:

contacting a hydrocarbon feed with one or more catalysts to produce a total product that includes the crude product, wherein at least one of the catalysts comprises one or more metals from Column 6 of the Periodic Table and/or one or more compounds of one or more metals from Column 6 of the Periodic Table and a support; wherein the support comprises from 0.01 grams to 0.2 grams of silica and from 0.80 grams to 0.99 grams of alumina per gram of support, and wherein the Column 6 metal catalyst has a surface area of at least 340 $m^2/g$, a pore size distribution with a median pore diameter of at most 100 Å, and at least 80% of its pore volume in pores having a pore diameter of at most 300 Å; and wherein surface area is as determined by ASTM Method D3663 and pore diameters and pore volumes are as measured by ASTM Method D4284.

Further, in some embodiments, the invention provides a method of producing a crude product, comprising:

contacting a hydrocarbon feed with one or more catalysts for at least 500 hours at a temperature of at least 200° C. and a pressure of at least 3.5 MPa to produce a total product that includes the crude product, wherein at least one of the catalysts comprises one or more metals from Column 6 of the Periodic Table and/or one or more compounds of one or more metals from Column 6 of the Periodic Table and a support; wherein the support comprises from 0.01 grams to 0.2 grams of silica and from 0.80 grams to 0.99 grams of alumina per gram of support, and wherein the Column 6 metal catalyst exhibits one or more peaks between 35 degrees and 70 degrees, as determined by x-ray diffraction at 2-theta, and at least one of the peaks has a base width of at least 10 degrees.

Further, in some embodiments, the invention provides a crude product produced by the methods as described above.

Further, in some embodiments, the invention provides a hydrocarbon composition, comprising:

a total Ni/Fe/V content of at least 200 wtppm as determined by ASTM Method D5708;

a residue content of at least 0.2 grams per gram of hydrocarbon composition as determined by ASTM Method D5307;

a distillate content of at least 0.2 grams per gram of hydrocarbon composition as determined by ASTM Method D5307;

a sulfur content of at least 0.04 grams per gram of hydrocarbon composition as determined by ASTM Method D4294; and a micro-carbon residue content of at least 0.06 grams per gram of hydrocarbon composition, as determined by ASTM Method D4530; and wherein the hydrocarbon composition has a viscosity of at most 100 cSt at 37.8° C. as determined by ASTM Method D445.

Further, in some embodiments, the invention provides a transportation fuel comprising one or more distillate fractions produced from the hydrocarbon composition as described above.

Further, in some embodiments, the invention provides a diluent produced from the hydrocarbon composition as described above.

In further embodiments, features from specific embodiments may be combined with features from other embodiments. For example, features from one embodiment may be combined with features from any of the other embodiments.

In further embodiments, additional features may be added to the specific embodiments described herein.

DETAILED DESCRIPTION OF THE INVENTION

Figure 1:
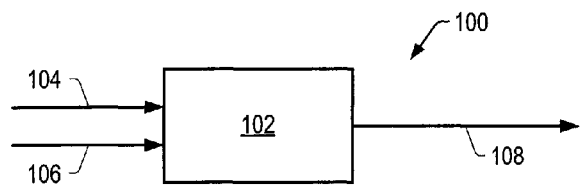
FIG. 1 is a schematic of an embodiment of a contacting system.

Advantages of how a hydrocarbon feed with a high viscosity can be converted into a crude product having a decreased viscosity with minimal hydrogen consumption by using a high surface area catalysts are described herein. The high surface area catalysts, preparation of such catalysts, contacting a hydrocarbon feed with such catalysts, the products obtained from such processes, and the uses of the products obtained are described herein. Certain embodiments of the inventions are described herein in more detail.

Terms used herein are defined as follows.

"ASTM" refers to American Standard Testing and Materials.

"API gravity" refers to API gravity at 15.5° C. (60° F.). API gravity is as determined by ASTM Method D6822.

Atomic hydrogen percentage and atomic carbon percentage of the hydrocarbon feed and the crude product are as determined by ASTM Method D5291.

"Bimodal catalyst" refers to a catalyst in which at least the majority of the pore volume is distributed in two statistical distributions of pore diameters, each statistical distribution having a significant peak when displayed on a pore volume versus pore diameter plot. For example, a bimodal catalyst may have 30% of its pore volume distributed in pores having a pore diameter between 50 and 100 Angstroms (with a peak showing at 80 A) and 25% of its pore volume distributed in pores having a pore diameter between 300 and 350 A (with a peak showing at 320 A).

Boiling range distributions for the hydrocarbon feed, the total product, and/or the crude product are as determined by ASTM Method D5307 unless otherwise mentioned.

"$C_5$ asphaltenes" refers to asphaltenes that are insoluble in n-pentane. $C_5$ asphaltenes content is as determined by ASTM Method D2007.

"$C_7$ asphaltenes" refers to asphaltenes that are insoluble in n-heptane. $C_7$ asphaltenes content is as determined by ASTM Method D3279.

"Column X metal(s)" refers to one or more metals of Column X of the Periodic Table and/or one or more compounds of one or more metals of Column X of the Periodic Table, in which X corresponds to a column number (for example, 1-12) of the Periodic Table. For example, "Column 6 metal(s)" refers to one or more metals from Column 6 of the Periodic Table and/or one or more compounds of one or more metals from Column 6 of the Periodic Table.

"Column X element(s)" refers to one or more elements of Column X of the Periodic Table, and/or one or more compounds of one or more elements of Column X of the Periodic Table, in which X corresponds to a column number (for example, 13-18) of the Periodic Table. For example, "Column 15 element(s)" refers to one or more elements from Column 15 of the Periodic Table and/or one or more compounds of one or more elements from Column 15 of the Periodic Table.

In the scope of this application, weight of a metal from the Periodic Table, weight of a compound of a metal from the Periodic Table, weight of an element from the Periodic Table, or weight of a compound of an element from the Periodic Table is calculated as the weight of metal or the weight of element. For example, if 0.1 grams of $MoO_3$ is used per gram of catalyst, the calculated weight of the molybdenum metal in the catalyst is 0.067 grams of molybdenum metal per gram of catalyst.

"Comulling" refers to contacting, combining, or pulverizing of at least two substances together such that at least two substances are mixed through mechanical and physical forces. Comulling can often form a substantially uniform or homogeneous mixture. Comulling includes the contacting of substances to yield a paste that can be extruded or formed into extrudate particles, spheroids, pills, tablets, cylinders, irregular extrusions or loosely bound aggregates or clusters, by any known extrusion, molding tableting, pressing, pelletizing, or tumbling methods. Comulling does not include impregnation methods in which a formed solid is immersed in a liquid or gas to absorb/adsorb components from the liquid or gas.

"Content" refers to the weight of a component in a substrate (for example, a hydrocarbon feed, a total product, or a crude product) expressed as weight fraction or weight percentage based on the total weight of the substrate. "Wtppm" refers to parts per million by weight.

"Distillate" refers to hydrocarbons with a boiling range distribution between 182° C. (360° F.) and 343° C. (650° F.) at 0.101 MPa. Distillate content is as determined by ASTM Method D5307.

"Heteroatoms" refers to oxygen, nitrogen, and/or sulfur contained in the molecular structure of a hydrocarbon. Heteroatoms content is as determined by ASTM Methods E385 for oxygen, D5762 for total nitrogen, and D4294 for sulfur. "Total basic nitrogen" refers to nitrogen compounds that have a pKa of less than 40. Basic nitrogen ("bN") is as determined by ASTM Method D2896.

"Hydrogen source" refers to hydrogen, and/or a compound and/or compounds, that when in the presence of a hydrocarbon feed and the catalyst, react to provide hydrogen to compound(s) in the hydrocarbon feed. A hydrogen source may include, but is not limited to, hydrocarbons (for example, $C_1$ to $C_4$ hydrocarbons such as methane, ethane, propane, and butane), water, or mixtures thereof. A mass balance may be conducted to assess the net amount of hydrogen provided to the compound(s) in the hydrocarbon feed.

"LHSV" refers to a volumetric liquid feed rate per total volume of catalyst and is expressed in hours ($h^{-1}$). Total volume of catalyst is calculated by summation of all catalyst volumes in the contacting zones, as described herein.

"Liquid mixture" refers to a composition that includes one or more compounds that are liquid at standard temperature and pressure (25° C., 0.101 MPa, hereinafter referred to as "STP"), or a composition that includes a combination of one of more compounds that are liquid at STP with one or more compounds that are solids at STP.

"Metals in metal salts of organic acids" refer to alkali metals, alkaline-earth metals, zinc, arsenic, chromium, or combinations thereof. A content of metals in metal salts of organic acids is as determined by ASTM Method D1318.

"Micro-Carbon Residue" ("MCR") content refers to a quantity of carbon residue remaining after evaporation and pyrolysis of a substrate. MCR content is as determined by ASTM Method D4530.

"Mineral-oxide fines" refers to oxides of metals ground to desired particle size. Examples of oxides of metals include, but are not limited to, alumina, silica, silica-alumina, titanium oxide, zirconium oxide, magnesium oxide, or mixtures thereof.

"Molybdenum content in the hydrocarbon feed" refers to the content of molybdenum in the feed. The molybdenum content includes the amount of inorganic molybdenum and organomolybdenum in the feed. Molybdenum content in the hydrocarbon feed is as determined by ASTM Method D5807.

"Monomodal catalyst" refers to a catalyst in which at least the majority of the pore volume is distributed in one statistical distribution of pore diameters, the statistical distribution having a significant peak when displayed on a pore volume versus pore diameter plot. For example, a monomodal catalyst may have 50% of its pore volume in pores having a pore diameter between 70 Å and 300 Å (with a peak at 150 Å).

"Naphtha" refers to hydrocarbon components with a boiling range distribution between 38° C. (100° F.) and 182° C. (360° F.) at 0.101 MPa. Naphtha content is as determined by ASTM Method D5307.

"Ni/V/Fe" refers to nickel, vanadium, iron, or combinations thereof.

"Ni/V/Fe content" refers to the content of nickel, vanadium, iron, or combinations thereof. The Ni/V/Fe content includes inorganic nickel, vanadium and iron compounds and/or organonickel, organovanadium, and organoiron compounds. The Ni/V/Fe content is as determined by ASTM Method D5708.

"$Nm^3/m^3$" refers to normal cubic meters of gas per cubic meter of hydrocarbon feed.

"Non-condensable gas" refers to components and/or mixtures of components that are gases at STP.

"Organometallic" refers to compound that includes an organic compound bonded or complexed with a metal of the Periodic Table. "Organometallic content" refers to the total content of metal in the organometallic compounds. Organometallic content is as determined by ASTM Method D5807.

"Periodic Table" refers to the Periodic Table as specified by the International Union of Pure and Applied Chemistry (IUPAC), November 2003.

"P (peptization) value" or "P-value" refers to a numeral value, which represents the flocculation tendency of asphaltenes in the hydrocarbon feed. P-Value is as determined by ASTM Method D7060.

"Pore diameter", "median pore diameter", and "pore volume" refer to pore diameter, median pore diameter, and pore volume, as determined by ASTM Method D4284 (mercury porosimetry at a contact angle equal to 140°). A Micromeritics® A9220 instrument (Micromeritics Inc., Norcross, Ga., U.S.A.) may be used to determine these values.

"Residue" refers to components that have a boiling range distribution above 538° C. (1000° F.), as determined by ASTM Method D5307.

"Sediment" refers to impurities and/or coke that are insoluble in the hydrocarbon feed/total product mixture. Sediment is as determined by ASTM Method D4807. Sediment may also be determined by the Shell Hot Filtration Test ("SHFST") as described by Van Kernoort et al. in the Jour. Inst. Pet., 1951, pages 596-604.

"SCFB" refers to standard cubic feet of gas per barrel of hydrocarbon feed.

"Surface area" of a catalyst is as determined by ASTM Method D3663.

"VGO" refers to hydrocarbons with a boiling range distribution between 343° C. (650° F.) and 538° C. (1000° F.) at 0.101 MPa. VGO content is as determined by ASTM Method D5307.

"Viscosity" refers to kinematic viscosity at 37.8° C. (100° F.). Viscosity is as determined using ASTM Method D445.

In the context of this application, it is to be understood that if the value obtained for a property of the substrate tested is outside of limits of the test method, the test method may be modified and/or recalibrated to test for such property.

"Hydrocarbon feed" refers to a feed that includes hydrocarbons. Hydrocarbon feed may include, but is not limited to, crudes, disadvantaged crudes, stabilized crudes, hydrocarbons obtained from refinery processes, or mixtures thereof. Examples of hydrocarbon feed obtained from refinery processes include, but are not limited to, long residue, short residue, naphtha, gasoil and/or hydrocarbons boiling above 538° C. (1000° F.), or mixtures thereof.

In one embodiment the hydrocarbon feed is a crude, herein also referred to as crude feed. Crude or crude feed refers to a feed of hydrocarbons which has been produced and/or retorted from hydrocarbon containing formations and which has not yet been distilled and/or fractionally distilled in a treatment facility to produce multiple components with specific boiling range distributions, such as atmospheric distillation methods and/or vacuum distillation methods. Crudes may be solid, semi-solid, and/or liquid. Crudes may include for example coal, bitumen, tar sands or crude oil. The crude or crude feed may be stabilized to form a stabilized crude, also referred to as stabilized crude feed. Stabilization may include, but is not limited to, removal of non-condensable gases, water, salts, or combinations thereof from the crude to form a stabilized crude. Such stabilization may often occur at, or proximate to, the production and/or retorting site.

Stabilized crudes have not been distilled and/or fractionally distilled in a treatment facility to produce multiple components with specific boiling range distributions (for example, naphtha, distillates, VGO, and/or lubricating oils). Distillation includes, but is not limited to, atmospheric distillation methods and/or vacuum distillation methods. Undistilled and/or unfractionated stabilized crudes may include components that have a carbon number above 4 in quantities of at least 0.5 grams of components per gram of crude. Examples of stabilized crudes include whole crudes, topped crudes, desalted crudes, desalted topped crudes, or combinations thereof.

"Topped" refers to a crude that has been treated such that at least some of the components that have a boiling point below 35° C. at 0.101 MPa (95° F. at 1 atm) have been removed. Topped crudes may have a content of at most 0.1 grams, at most 0.05 grams, or at most 0.02 grams of such components per gram of the topped crude.

Some stabilized crudes have properties that allow the stabilized crudes to be transported to conventional treatment facilities by transportation carriers (for example, pipelines, trucks, or ships). Other crudes have one or more unsuitable properties that render them disadvantaged.

Disadvantaged crudes may be unacceptable to a transportation carrier and/or a treatment facility, thus imparting a low economic value to the disadvantaged crude. The economic value may be such that a reservoir that includes the disadvantaged crude is deemed too costly to produce, transport, and/or treat.

The properties of the hydrocarbon feed, such as for example the crudes or disadvantaged crudes may vary widely.

The hydrocarbon feed, such as for example a crude feed, may have a viscosity of at least 10 cSt at 37.8° C., at least 100 cSt, at least 1000 cSt, or at least 2000 cSt at 37.8° C.

The hydrocarbon feed, such as for example a crude feed, may have an API gravity at most 19, at most 15, or at most 10. It may further have an API gravity of at least 5.

The hydrocarbon feed, such as for example a crude feed, may have a total Ni/V/Fe content of at least 0.00002 grams or at least 0.0001 grams of Ni/V/Fe per gram of hydrocarbon feed;

The hydrocarbon feed, such as for example a crude feed, may have a total heteroatoms content of at least 0.005 grams of heteroatoms per gram of hydrocarbon feed;

In some embodiments, the hydrocarbon feed has at least 0.001 grams of oxygen containing compounds per gram of hydrocarbon feed, and wherein the crude product has a oxygen containing compounds content of at most 90% of the hydrocarbon feed oxygen-containing compounds content, wherein oxygen is as determined by ASTM Method E385.

The hydrocarbon feed, such as for example a crude feed, may have a residue content of at least 0.01 grams of residue per gram of hydrocarbon feed. In some embodiments, the hydrocarbon or crude feed may include, per gram of feed, at least 0.2 grams of residue, at least 0.3 grams of residue, at least 0.5 grams of residue, or at least 0.9 grams of residue.

The hydrocarbon feed, such as for example a crude feed, may have per gram of hydrocarbon feed, a sulfur content of at least 0.005, at least 0.01, or at least 0.02 grams.

The hydrocarbon feed, such as for example a crude feed, may have per gram of hydrocarbon feed, a nitrogen content of at least 0.0005, at least 0.001, or at least 0.002 grams. The hydrocarbon feed, such as for example a crude feed, may have a $C_5$ asphaltenes content of at least 0.04 grams or at least 0.08 grams of $C_5$ asphaltenes per gram of hydrocarbon feed; and/or at least 0.02 grams or at least 0.04 grams of $C_7$ asphaltenes per gram of hydrocarbon feed.

The hydrocarbon feed, such as for example a crude feed, may have a MCR content of at least 0.002 grams of MCR per gram of hydrocarbon feed The hydrocarbon feed, such as for example a crude feed, may have a content of metals in metal salts of organic acids of at least 0.00001 grams of metals per gram of hydrocarbon feed The hydrocarbon feed, such as for example a crude feed, may further have a molybdenum content of at least 0.1 wtppm;

The hydrocarbon feed, such as for example a crude feed, may further have any kind of combination of the above mentioned properties.

The hydrocarbon feed, such as for example a crude feed, may include per gram of feed: at least 0.001 grams, at least 0.005 grams, or at least 0.01 grams of hydrocarbons with a boiling range distribution between 95° C. and 200° C. at 0.101 MPa; at least 0.001 grams, at least 0.005 grams, or at least 0.01 grams of hydrocarbons with a boiling range distribution between 200° C. and 300° C. at 0.101 MPa; at least 0.001 grams, at least 0.005 grams, or at least 0.01 grams of hydrocarbons with a boiling range distribution between 300° C. and 400° C. at 0.101 MPa; and at least 0.001 grams, at least 0.005 grams, or at least 0.01 grams of hydrocarbons with a boiling range distribution between 400° C. and 650° C. at 0.101 MPa.

In a further embodiment, the hydrocarbon feed, such as for example a crude feed, may include per gram of feed: at least 0.001 grams, at least 0.005 grams, or at least 0.01 grams of hydrocarbons with a boiling range distribution of at most 100° C. at 0.101 MPa; at least 0.001 grams, at least 0.005 grams, or at least 0.01 grams of hydrocarbons with a boiling range distribution between 100° C. and 200° C. at 0.101 MPa; at least 0.001 grams, at least 0.005 grams, or at least 0.01 grams of hydrocarbons with a boiling range distribution between 200° C. and 300° C. at 0.101 MPa; at least 0.001 grams, at least 0.005 grams, or at least 0.01 grams of hydrocarbons with a boiling range distribution between 300° C. and 400° C. at 0.101 MPa; and at least 0.001 grams, at least 0.005 grams, or at least 0.01 grams of hydrocarbons with a boiling range distribution between 400° C. and 650° C. at 0.101 MPa.

Some hydrocarbon feeds or crude feeds may include, per gram of feed, at least 0.001 grams, at least 0.005 grams, or at least 0.01 grams of hydrocarbons with a boiling range distribution of at most 100° C. at 0.101 MPa, in addition to higher boiling components. Typically, the disadvantaged crude has, per gram of disadvantaged crude, a content of such hydrocarbons of at most 0.2 grams or at most 0.1 grams.

Some hydrocarbon feeds or crude feeds may include, per gram of feed, at least 0.001 grams, at least 0.005 grams, or at least 0.01 grams of hydrocarbons with a boiling range distribution of at least 200° C. at 0.101 MPa.

Some hydrocarbon feeds or crude feeds may include, per gram of feed, at least 0.001 grams, at least 0.005 grams, or at least 0.01 grams of hydrocarbons with a boiling range distribution of at least 650° C.

Examples of crudes that might be treated using the processes described herein include, but are not limited to, crudes from of the following regions of the world: U.S. Gulf Coast and southern California, Canada Tar sands, Brazilian Santos and Campos basins, Egyptian Gulf of Suez, Chad, United Kingdom North Sea, Angola Offshore, Chinese Bohai Bay, Venezuelan Zulia, Malaysia, and Indonesia Sumatra.

Treatment of disadvantaged crudes may enhance the properties of the disadvantaged crudes such that the crudes are acceptable for transportation and/or treatment.

The hydrocarbon feed may be topped, as described herein. The crude product resulting from treatment of the hydrocarbon feed, as described herein, is generally suitable for transporting and/or treatment. Properties of the crude product produced as described herein are closer to the corresponding properties of West Texas Intermediate crude than the hydrocarbon feed, or closer to the corresponding properties of Brent crude, than the hydrocarbon feed, thereby enhancing the economic value of the hydrocarbon feed. Such crude product may be refined with less or no pre-treatment, thereby enhancing refining efficiencies. Pre-treatment may include desulfurization, demetallization, and/or atmospheric distillation to remove impurities.

For example, in some embodiments, removal of at least a portion of the organometallic compounds and/or metals from the hydrocarbon feed is performed before the hydrocarbon feed is contacted with other catalysts. For example, a small amount of organomolybdenum and/or organocopper (for example, at most 50 wtppm, at most 20 wtppm, or at most 10 wtppm) in a hydrocarbon feed may reduce the activity of a catalyst upon contact of the hydrocarbon feed with the catalyst.

Treatment of a hydrocarbon feed in accordance with embodiments described herein may include contacting the hydrocarbon feed with the catalyst(s) in a contacting zone and/or combinations of two or more contacting zones. In a contacting zone, at least one property of a hydrocarbon feed may be changed by contact of the hydrocarbon feed with one or more catalysts relative to the same property of the hydrocarbon feed. In some embodiments, contacting is performed in the presence of a hydrogen source. In some embodiments, the hydrogen source is one or more hydrocarbons that, under certain contacting conditions, react to provide relatively small amounts of hydrogen to compound(s) in the hydrocarbon feed.

In some embodiments the hydrocarbon feed may have a viscosity of at least 100 cSt at 37.8° C., and contacting conditions may be controlled to produce the crude product; the crude product having a viscosity at 37.8° C. of at most 50% of the viscosity of the hydrocarbon feed at 37.8° C., and viscosity is as determined by ASTM Method D445

In some embodiments the hydrocarbon feed may have a copper content of at least 1 wtppm, and contacting conditions may be controlled such that the crude product has a copper content of at most 90% of the hydrocarbon feed copper content, wherein the copper content is as determined by ASTM Method D1318.

FIG. 1 is a schematic of contacting system 100 that includes contacting zone 102. The hydrocarbon feed enters upstream contacting zone 102 via hydrocarbon feed conduit 104. A contacting zone may be a reactor, a portion of a reactor, multiple portions of a reactor, or combinations thereof. Examples of a contacting zone include a stacked bed reactor, a fixed bed reactor, an ebullating bed reactor, a continuously stirred tank reactor ("CSTR"), a fluidized bed reactor, a spray reactor, and a liquid/liquid contactor. Configuration of one or more contacting zones is described in U.S. Published Patent Application No. 20050133414 to Bhan et al., which is incorporated herein by reference. In certain embodiments, the contacting system is on or coupled to an offshore facility. Contact of the hydrocarbon feed with catalyst(s) in contacting system 100 may be a continuous process or a batch process.

The contacting zone may include one or more catalysts (for example, two catalysts). In some embodiments, contact of the hydrocarbon feed with a first catalyst of the two catalysts may reduce a portion of selected metals content and/or compounds that contribute to residue content of the hydrocarbon feed. Subsequent contact of the reduced metal/residue content hydrocarbon feed with the second catalyst decreases viscosity and/or increases API gravity. In other embodiments, viscosity, $C_5$ asphaltenes, $C_7$ asphaltenes, organometallic content or combinations of these properties of the crude product change by at least 10% relative to the same properties of the hydrocarbon feed after contact of the hydrocarbon feed with one or more catalysts.

In certain embodiments, a volume of catalyst in the contacting zone is in a range from 10 vol % to 60 vol %, 20 vol % to 50 vol %, or 30 vol % to 40 vol % of a total volume of hydrocarbon feed in the contacting zone. In some embodiments, a slurry of catalyst and hydrocarbon feed may include from 0.001 grams to 10 grams, 0.005 grams to 5 grams, or 0.01 grams to 3 grams of catalyst per 100 grams of hydrocarbon feed in the contacting zone.

Contacting conditions in the contacting zone may include, but are not limited to, temperature, pressure, hydrogen source flow, hydrocarbon feed flow, or combinations thereof. Contacting conditions in some embodiments are controlled to produce a crude product with specific properties. Preferably the contacting temperature is at least 200° C. In some embodiments, temperature in a contacting zone may range from 350° C. to 450° C., from 360° C. to 440° C., or from 370° C. to 430° C. LHSV of the hydrocarbon feed will generally range from $0.1\ h^{-1}$ to $30\ h^{-1}$, $0.4\ h^{-1}$ to $25\ h^{-1}$, $0.5\ h^{-1}$ to $20\ h^{-1}$, $1\ h^{-1}$ to $15\ h^{-1}$, $1.5\ h^{-1}$ to $10\ h^{-1}$, or $2\ h^{-1}$ to $5\ h^{-1}$. In some embodiments, LHSV is at least $5\ h^{-1}$, at least $11\ h^{-1}$, at least $15\ h^{-1}$, or at least $20\ h^{-1}$. A partial pressure of hydrogen in the contacting zone may range from 0.1 MPa to 8 MPa, 1 MPa to 7 MPa, 2 MPa to 6 MPa, or 3 MPa to 5 MPa. In some embodiments the partial pressure of hydrogen may be at least 3.5 MPa. In some embodiments, a partial pressure of hydrogen may be at most 7 MPa, at most 6 MPa, at most 5 MPa.

In embodiments in which the hydrogen source is supplied as a gas (for example, hydrogen gas), a ratio (as determined at normal conditions of 20° C. temperature and 1.013 bar pressure, herein below referred to as $Nm^3/m^3$) of the gaseous hydrogen source to the hydrocarbon feed typically ranges from $0.1\ Nm^3/m^3$ to $100,000\ Nm^3/m^3$, $0.5\ Nm^3/m^3$ to $10,000\ Nm^3/m^3$, $1\ Nm^3/m^3$ to $8,000\ Nm^3/m^3$, $2\ Nm^3/m^3$ to $5,000\ Nm^3/m^3$, $5\ Nm^3/m^3$ to $3,000\ Nm^3/m^3$, or $10\ Nm^3/m^3$ to $800\ Nm^3/m^3$ contacted with the catalyst(s). The hydrogen source, in some embodiments, is combined with carrier gas(es) and recirculated through the contacting zone. Carrier gas may be, for example, nitrogen, helium, and/or argon. The carrier gas may facilitate flow of the hydrocarbon feed and/or flow of the hydrogen source in the contacting zone(s). The carrier gas may also enhance mixing in the contacting zone(s). In some embodiments, a hydrogen source (for example, hydrogen, methane or ethane) may be used as a carrier gas and recirculated through the contacting zone.

The hydrogen source may enter contacting zone 102 cocurrently with the hydrocarbon feed via hydrocarbon feed conduit 104 or separately via gas conduit 106. In contacting zone 102, contact of the hydrocarbon feed with a catalyst produces a total product that includes a crude product, and, in some embodiments, gas. In some embodiments, a carrier gas is combined with the hydrocarbon feed and/or the hydrogen source in conduit 106. The total product may exit contacting zone 102 and be transported to other processing zones, storage vessels, or combinations thereof via conduit 108.

In some embodiments, the total product may contain processing gas and/or gas formed during processing. Such gases may include, for example, hydrogen sulfide, carbon dioxide, carbon monoxide, excess gaseous hydrogen source, and/or a carrier gas. If necessary, the excess gas may be separated from the total product and recycled to contacting system 100, purified, transported to other processing zones, storage vessels, or combinations thereof. In some embodiments, gas produced during the process is at most 10 vol % based on total product, at most 5 vol % based on total product, or at most 1 vol % based the total product produced. In some embodiments, minimal or non-detectable amounts of gas are produced during contact of the feed with the catalyst. In such cases, the total product is considered the crude product.

In some embodiments, a crude (either topped or untopped) is produced from a reservoir and separated prior to contact with one or more catalysts in contacting zone 102. During the separation process, at least a portion of the hydrocarbon feed is separated using techniques known in the art (for example, sparging, membrane separation, pressure reduction) to produce the hydrocarbon feed. For example, water may be at least partially separated from a disadvantaged crude. In another example, components that have a boiling range distribution below 95° C. or below 100° C. may be at least partially separated from the crude to produce the hydrocarbon feed. In some embodiments, at least a portion of naphtha and compounds more volatile than naphtha are separated from the disadvantaged crude.

In some embodiments, the crude product is blended with a crude that is the same as or different from the hydrocarbon feed. For example, the crude product may be combined with a crude having a different viscosity thereby resulting in a blended product having a viscosity that is between the viscosity of the crude product and the viscosity of the crude. In another example, the crude product may be blended with crude having a TAN, viscosity and/or API gravity that is different, thereby producing a product that has a selected property that is between that selected property of the crude product and the crude. The blended product may be suitable for transportation and/or treatment. In some embodiments, disadvantaged crude is separated to form the hydrocarbon feed. The hydrocarbon feed is then contacted with one or more catalysts to change a selected property of the hydrocarbon feed to form a total product. At least a portion of the total product and/or at least a portion of a crude product from the total product may blended with at least a portion of the disadvantaged crude and/or a different crude to obtain a product having the desired properties.

In some embodiments, the crude product and/or the blended product are transported to a refinery and distilled and/or fractionally distilled to produce one or more hydrocarbon fractions. The hydrocarbon fractions may be processed to produce commercial products such as transportation fuel, lubricants, or chemicals. Blending and separating of the disadvantaged crude and/or hydrocarbon feed, total product and/ or crude product is described U.S. Published Patent Application No. 20050133414 to Bhan et al., which is incorporated herein by reference.

In certain embodiments, the crude product has at least 100 wtppm, at least 150 wtppm, at least 200 wtppm or at least 220 wtppm of Ni/V/Fe. In some embodiments, a total Ni/V/Fe content of the crude product is 70% to 130%, 80% to 120%, or 90% to 110% of the Ni/V/Fe content of the hydrocarbon feed. In certain embodiments, the crude product has a total Ni/V/Fe content in a range from 0.1 to 5000 wtppm, from 1 to 1000 wtppm, from 10 to 500 wtppm, or from 100 to 350 wtppm.

In some embodiments, the crude product has a total molybdenum content of at most 90%, at most 50%, at most 10%, at most 5%, or at most 3% of the molybdenum content of the hydrocarbon feed. In certain embodiments, the crude product has a total molybdenum content ranging from 0.001 wtppm to 1 wtppm, from 0.005 wtppm to 0.1 wtppm, or from 0.01 to 0.05 wtppm.

In some embodiments, the crude product has a copper content of at most 90%, at most 50%, or at most 30% of the copper content of the hydrocarbon feed. In certain embodiments, the crude product has a total copper content ranging from 0.001 wtppm to 1 wtppm, or from 0.005 wtppm to 0.5 wtppm.

In certain embodiments, the crude product has a total content of metals in metal salts of organic acids, per gram of crude product, in a range from 0.1 wtppm to 50 wtppm, 3 wtppm to 20 wtppm grams, or 10 wtppm to 1 wtppm of total metals in metal salt of organic acids per gram of crude product.

In certain embodiments, API gravity of the crude product produced from contact of the hydrocarbon feed with catalyst, at the contacting conditions, is increased by at least 2, at least 3, at least 5, or at least 10 relative to the API gravity of the hydrocarbon feed. In certain embodiments, API gravity of the crude product ranges from 7 to 40, 10 to 30, or 12 to 25.

In certain embodiments, the crude product has a viscosity of at most 90%, at most 80%, at most 50%, or at most 10% of the viscosity of the hydrocarbon feed. In some embodiments, the viscosity of the crude product is at most 1000, at most 500, or at most 100 cSt.

In some embodiments, the sulfur content of the crude product is at most 90%, at most 80% or at most 70% of the sulfur content of the hydrocarbon feed. In some embodiments the sulfur content of the crude product is at least 0.02 grams per gram of crude product. The sulfur content of the crude product may range from 0.001 grams to 0.1 grams, from 0.005 to 0.08 grams or from 0.01 to 0.06 grams per gram of crude product.

In some embodiments, the nitrogen content of the crude product is 70% to 130%, 80% to 120%, or 90% to 110% of the nitrogen content of the hydrocarbon feed. In some embodiments the nitrogen content of the crude product is at least 0.02 grams per gram of crude product. The nitrogen content of the crude product may range from 0.001 grams to 0.1 grams, from 0.005 to 0.08 grams or from 0.01 to 0.05 grams per gram of crude product.

In some embodiments, the crude product includes, in its molecular structures, from 0.05 grams to 0.15 grams or from 0.09 grams to 0.13 grams of hydrogen per gram of crude product. The crude product may include, in its molecular structure, from 0.8 grams to 0.9 grams or from 0.82 grams to 0.88 grams of carbon per gram of crude product. A ratio of atomic hydrogen to atomic carbon (H/C) of the crude product may be within 70% to 130%, 80% to 120%, or 90% to 110% of the atomic H/C ratio of the hydrocarbon feed. A crude product atomic H/C ratio within 10% to 30% of the hydrocarbon feed atomic H/C ratio indicates that uptake and/or consumption of hydrogen in the process is relatively small, and/or that hydrogen is produced in situ.

The crude product includes components with a range of boiling points.

In some embodiments, the crude product has a distillate content of at least 110%, at least 120%, or at least 130% of the distillate content of the hydrocarbon feed. The distillate content of the crude product may be, per gram of crude product, in a range from 0.00001 grams to 0.6 grams (0.001-60 wt %), 0.001 grams to 0.5 grams (0.1-50 wt %), or 0.01 grams to 0.4 grams (1-40 wt %).

In certain embodiments, the crude product has a VGO content, boiling between 343° C. to 538° C. at 0.101 MPa, of 70% to 130%, 80% to 120%, or 90% to 110% of the VGO content of the hydrocarbon feed. In some embodiments, the crude product has, per gram of crude product, a VGO content in a range from 0.00001 grams to 0.8 grams, 0.001 grams to 0.7 grams, 0.01 grams to 0.6 grams, or 0.1 grams to 0.5 grams.

In some embodiments, the crude product has a residue content of at most 90%, at most 80%, or at most 50% of the residue content of the hydrocarbon feed. The crude product may have, per gram of crude product, a residue content in a range from in a range from 0.00001 grams to 0.8 grams, 0.001 grams to 0.7 grams, 0.01 grams to 0.6 grams, 0.05 grams to 0.5 grams, or 0.1 to 0.3 grams.

In some embodiments, the crude product has a total $C_5$ and $C_7$ asphaltenes content of at most 90%, at most 80%, at most 75%, or at most 50% of the total $C_5$ and $C_7$ asphaltenes content of the hydrocarbon feed. In other embodiments, the $C_5$ asphaltenes content of the hydrocarbon feed is at least 10%, at least 30%, or at least 40% of the $C_5$ asphaltenes content of the hydrocarbon feed. In certain embodiments, the crude product has, per gram of hydrocarbon feed, a total $C_5$ and $C_7$ asphaltenes content ranging from 0.001 grams to 0.2 grams, 0.01 to 0.15 grams, or 0.05 grams to 0.15 grams.

In certain embodiments, the crude product has a MCR content of at most 95%, at most 90%, or at most 80% of the MCR content of the hydrocarbon feed. In some embodiments, decreasing the $C_5$ asphaltenes content of the hydrocarbon feed while maintaining a relatively stable MCR content may increase the stability of the hydrocarbon feed/total product mixture. The crude product has, in some embodiments, from 0.0001 grams to 0.20 grams, 0.005 grams to 0.15 grams, or 0.01 grams to 0.010 grams of MCR per gram of crude product.

In certain embodiments, the crude product is a hydrocarbon composition that has a total Ni/Fe/V content of at least 200 wtppm; a residue content of at least 0.2 grams per gram of hydrocarbon composition; a distillate content of at least 0.2 grams per gram of hydrocarbon composition; a sulfur content of at least 0.04 grams per gram of hydrocarbon composition; and a micro-carbon residue content of at least 0.06 grams per gram of hydrocarbon composition; and a viscosity of at most 100 cSt at 37.8° C.

It may be desirable to only selectively reduce one or more components (for example, viscosity) in a hydrocarbon feed without significantly changing the amount of sulfur and/or Ni/V/Fe in the hydrocarbon feed. In this manner, hydrogen uptake during contacting may be "concentrated" on viscosity reduction, and not reduction of other components. Reduction of sulfur typically requires the catalyst to include additional metals (for example, nickel and/or cobalt). Conversion of hydrocarbons that contain sulfur and/or other heteroatoms may attribute to hydrogen consumption during processing. Since less of such hydrogen is also being used to reduce other components in the hydrocarbon feed, the amount of hydrogen used during the process may be minimized. A catalyst having minimal amount of Columns 7-10 metal(s), a high surface area, and a selected pore distribution may assist in reduction of components in a hydrocarbon feed that contribute to high viscosity to produce a crude product with reduced viscosity as compared to the hydrocarbon feed. In some embodiments, the crude product may have a minimal change in other properties as compared to the hydrocarbon feed. The produced crude product may have acceptable properties that allow it to be transported to treatment facilities and/or other processing units. For example, a hydrocarbon feed may have a high viscosity, but a Ni/V/Fe and/or sulfur content that is acceptable to meet treatment and/or transportation specifications. Such hydrocarbon feed may be more efficiently treated with the catalyst described herein by reducing viscosity without also reducing Ni/V/Fe or sulfur content.

In some embodiments, contact of a hydrocarbon feed using the catalysts described herein at temperatures of at least 200° C. and pressures of at most 5 MPa or at most 7 MPa produces a crude product that has a viscosity of at most 100 cSt at 37.8° C., a total Ni/Fe/V content of at least 200 wtppm, a residue content of at least 0.2 grams per gram of crude product, a distillate content of at least 0.2 grams per gram of crude product, a sulfur content of at least 0.04 grams per gram of crude product, and a micro-carbon residue content of at least 0.06 grams per gram of crude product.

Catalysts used in one or more embodiments of the inventions may include one or more bulk metals and/or one or more metals on a support. The metals may be in elemental form or in the form of a compound of the metal. The catalysts described herein may be introduced into the contacting zone as a precursor, and then become active as a catalyst in the contacting zone (for example, when sulfur and/or a hydrocarbon feed containing sulfur is contacted with the precursor).

In certain embodiments, the catalyst includes Column 6 metal(s). Column 6 metal(s) include, but are not limited to, chromium, molybdenum, tungsten. The catalyst may have, per gram of catalyst, a total Column 6 metal(s) content of at least 0.00001, at least 0.01 grams, at least 0.02 grams and/or in a range from 0.0001 grams to 0.6 grams, 0.001 grams to 0.3 grams, 0.005 grams to 0.1 grams, or 0.01 grams to 0.08 grams. In some embodiments, the catalyst includes from 0.0001 grams to 0.06 grams of Column 6 metal(s) per gram of catalyst. In some embodiments, compounds of Column 6 metal(s) include oxides such as molybdenum trioxide and/or tungsten trioxide. In certain embodiments, the catalyst includes only Column 6 metals or only Column 6 compounds. In an embodiment, the catalyst includes only molybdenum and/or molybdenum oxides.

In some embodiments, the catalyst includes a combination of Column 6 metal(s) with one or more metals from Columns 7-10. Columns 7-10 metal(s) include, but are not limited to, manganese, technetium, rhenium, iron, cobalt, nickel, ruthenium, palladium, rhodium, osmium, iridium, platinum, or mixtures thereof. The catalyst may have, per gram of catalyst, a total Columns 6-10 metal(s) content in a range from at least 0.0001 grams, at least 0.001 grams, at least 0.01 grams, or in a range of 0.0001 grams to 0.6 grams, 0.001 grams to 0.3 grams, 0.005 grams to 0.1 grams, or 0.01 grams to 0.08 grams. In some embodiments, the catalyst includes Column 15 element(s) in addition to the Columns 6-10 metal(s). In some embodiments, the catalyst has at most 0.03 grams, at most 0.02 grams or 0.01 grams of Columns 7-10 metals per gram of catalyst. In some embodiments, the catalyst does not include Columns 7-10 metals.

In some embodiments the catalyst contains at most 0.03 grams, at most 0.01 grams, or at most 0.005 grams per gram of catalyst of one or more metals from Columns 9 and 10 of the Periodic Table and/or one or more compounds of one or more compounds of one or more metals from Columns 9 and 10 of the Periodic Table. In a still further embodiment the catalyst does not include any such metals.

A molar ratio of Column 6 metal to Columns 7-10 metal in the catalyst may be in a range from 0.1 to 20, 1 to 10, or 2 to 5. In some embodiments, the catalyst includes Column 15 element(s) in addition to the combination of Column 6 metal(s) with one or more metals from Columns 7-10. In other embodiments, the catalyst includes Column 6 metal(s) and Column 10 metal(s). A molar ratio of the total Column 10 metal to the total Column 6 metal in the catalyst may be in a range from 1 to 10, or from 2 to 5.

In some embodiments, the catalyst includes Column 15 element(s) in addition to the Column 6 metal(s). Examples of Column 15 elements include phosphorus. The catalyst may have a total Column 15 element content, per gram of catalyst, in range from 0.000001 grams to 0.1 grams, 0.00001 grams to 0.06 grams, 0.00005 grams to 0.03 grams, or 0.0001 grams to 0.001 grams.

In some embodiments, Column 6 metal(s) alone or in combination with Columns 7-10 metal(s) are incorporated with a support to form the catalyst. In certain embodiments, Column 15 element(s) are also incorporated with a support to form the catalyst.

The support includes silica and alumina. In embodiments in which the metal(s) and/or element(s) are supported, the weight of the catalyst includes all support, all metal(s), and all element(s). The support may be porous.

In some embodiments, the support includes silica and alumina in combination with limited amounts of other refractory oxides, porous carbon based materials, zeolites, or combinations thereof. Refractory oxides may include, but are not limited to, alumina, silica, silica-alumina, titanium oxide, zirconium oxide, magnesium oxide, or mixtures thereof. Supports may be obtained from a commercial manufacturer such as Criterion Catalysts and Technologies LP (Houston, Tex., U.S.A.). Porous carbon based materials include, but are not limited to, activated carbon and/or porous graphite. Examples of zeolites include Y-zeolites, beta zeolites, mordenite zeolites, ZSM-5 zeolites, and ferrierite zeolites.

Zeolites may be obtained from a commercial manufacturer such as Zeolyst (Valley Forge, Pa., U.S.A.).

In certain embodiments, the support includes gamma alumina, delta alumina, alpha alumina, or combinations thereof. In some embodiments, the support includes from 0.0001 grams to 0.20 grams, 0.001 grams to 0.11 grams, or 0.01 grams to 0.05 grams of silica; and 0.80 grams to 0.9999 grams, 0.90 grams to 0.999 grams, or 0.95 to 0.97 grams of alumina per gram of support. Incorporation of silica into the support may assist in dispersing catalytic metals (for example, Column 6 metal(s) or Column 6 metals in combination with Columns 7-10 metal(s)) throughout the support. Dispersion of catalytic metals throughout the support may allow formation of a catalyst having a surface area of at least 340 $m^2/g$, at least 360 $m^2/g$, or at least 400 $m^2/g$.

Catalyst that have a large surface area with a minimal amount of catalytic metal (for example Column 6 metal(s)) on the surface of the catalyst may be prepared by comulling the catalytic metal with a support. Comulling of the support and Column 6 metal(s) may form a substantially uniform or homogeneous mixture. In some embodiments, water and/or solvent may be added during the comulling to facilitate forming the mixture into a paste that may be extruded or formed into extrudate particles, spheroids, pills, tablets, cylinders, irregular extrusions or loosely bound aggregates or clusters, by any known extrusion, molding tableting, pressing, pelletizing, or tumbling methods.

Column 6 metal(s) and a support may be contacted with suitable mixing equipment. Examples of suitable mixing equipment include tumblers, stationary shells or troughs, Muller mixers (for example, batch type or continuous type), impact mixers, and any other generally known mixer, or generally known device, that will suitably provide the Column 6 metal(s)/support mixture. In certain embodiments, the materials are mixed until the Column 6 metal(s) is (are) substantially homogeneously dispersed in the support. Dispersion of the Column 6 metal(s) in the support may inhibit coking of the Column 6 metal(s) at high temperatures and/or pressures, thus allowing hydrocarbon feeds containing significant amounts of residue and/or high viscosities to be processed at rates, temperatures and pressures not obtainable by using conventional catalysts made using impregnation techniques. In some embodiments, comulling of a support containing silica and Column 6 metal(s) forms a smoother catalyst surface.

Combining the Column 6 metal(s) with the support allows (for example, comulling, in contrast to impregnation of a support) at least a portion of the metal(s) to reside under the surface of the embedded metal catalyst (for example, embedded in the support), leading to less metal on the surface than would otherwise occur in the unembedded metal catalyst. In some embodiments, having less metal on the surface of the catalyst extends the life and/or catalytic activity of the catalyst by allowing at least a portion of the metal to move to the surface of the catalyst during use. The metals may move to the surface of the catalyst through erosion of the surface of the catalyst during contact of the catalyst with a hydrocarbon feed.

Without wishing to bound by any kind of theory, it is thought that the addition intercalation and/or mixing of the components of the catalysts may change the structured order of the Column 6 metal in the Column 6 oxide crystal structure to a substantially random order of Column 6 metal in the crystal structure of the embedded catalyst. The order of the Column 6 metal may be determined using powder x-ray diffraction methods. The order of elemental metal in the catalyst relative to the order of elemental metal in the metal oxide may be determined by comparing the order of the Column 6 metal peak in an x-ray diffraction spectrum of the Column 6 oxide to the order of the Column 6 metal peak in an x-ray diffraction spectrum of the catalyst. From broadening and/or absence of patterns associated with Column 6 metal in an x-ray diffraction spectrum, it is possible to estimate that the Column 6 metal(s) are substantially randomly ordered in the crystal structure. For example, molybdenum trioxide and the silica/alumina support having a median pore diameter of at least 180 Å may be combined to form an alumina/molybdenum trioxide mixture. Molybdenum trioxide has a definite x-ray diffraction pattern (for example, definite $D_{001}$, $D_{002}$ and/or $D_{003}$ peaks). The support/molybdenum trioxide mixture may be heat treated at a temperature of at least 316° C. (600° F.), at least 427° C. (800° F.), or at least 538° C. (1000° F.) to produce a catalyst that does not exhibit a pattern for molybdenum dioxide in an x-ray diffraction spectrum (for example, an absence of the $D_{001}$ peak).

In some embodiments, contacting a Column 6 metal(s)/support mixture forms a Column 6 metal/support mixture. In some embodiments, an acid and/or water is added to the Column 6 metal/support mixture to assist in formation of the Column 6 metal/support mixture into particles. The water and/or dilute acid are added in such amounts and by such methods as required to give the Column 6 metal/support mixture a desired consistency suitable to be formed into particles. Examples of acids include, but are not limited to, nitric acid, acetic acid, sulfuric acid, and hydrochloric acid.

The Column 6 metal/support mixture may be formed into particles using known techniques in the art such as an extruder. The particles (extrudates) may be cut using known catalyst cutting methods to form particles. The particles may be heat treated at a temperature in a range from 65° C. to 260° C. or from 85° C. to 235° C. for a period of time (for example, for 0.5-8 hours) and/or until the moisture content of the particle has reached a desired level.

The Column 6 metal(s)/support and/or the Column 6 metal(s)/support particles may be heat treated (calcined) in the presence of hot air and/or oxygen containing air at a temperature in a range between 315° C. and 760° C., between 535° C. and 760° C., or between 500° C. and 650° C. to remove volatile matter such that at least a portion of the Columns 6-10 metals are converted to the corresponding metal oxide. The temperature conditions at which the particles are calcined may be such that the pore structure of the final calcined mixture is controlled to form the pore structure and surface areas of the catalysts described herein. Calcining at temperatures greater than 760° C. may increase the pore volume of the catalyst, thus change the distribution of pores and the surface area such that the catalyst is not as effective in removing compounds that contribute to high viscosity and/or residue. In one embodiment Column 6 metal(s)/support composition may be calcined at a temperature in the range from 315° C. to 675° C., in the range from 400° C. to 650° C., or in the range from 450° C. to 600° C., in order to create a large surface area.

A catalyst with dispersed metals may advantageously have a longer life than the conventional hydroprocessing catalyst, at elevated temperatures and lower pressures (for example, temperatures of at least 200° C. or at least 400° C. and pressures of at most 7 MPa, at most 5 MPa, or at most 3.8 MPa). The selected dispersed metal catalyst may allow a process to be run without recharging or changing the catalyst, thus cost of processing the hydrocarbon feed may be economically advantageous. The catalyst may remain active during contact with a hydrocarbon feed for at least 500 hours, at least 1000 hours, at least 2000 hours, at least 3000 hours, at least 6000 hours or at least 9000 hours.

In some embodiments, catalysts may be characterized by pore structure. Various pore structure parameters include, but are not limited to, pore diameter, pore volume, surface areas, or combinations thereof. The catalyst may have a distribution of total quantity of pore sizes versus pore diameters. The median pore diameter of the pore size distribution may be in a range from 30 Å to 100 Å, 50 Å to 90 Å, or 60 Å to 80 Å.

The catalyst may have a pore size distribution with a median pore diameter of at least 60 Å, at least 90 Å, or at most 100 Å. In some embodiments, the catalyst has a pore size distribution with a median pore diameter in a range from 30 Å to 100 Å, 50 Å to 90 Å, or 60 Å to 80 Å, with at least 60% of a total number of pores in the pore size distribution having a pore diameter within 50 Å, 40 Å, or 30 Å of the median pore diameter.

In some embodiments, pore volume of pores in the catalyst may be at least 0.3 $cm^3/g$, at least 0.7 $cm^3/g$, or at most 1.2 $cm^3/g$. In certain embodiments, pore volume of pores in the catalyst may range from 0.3 $cm^3/g$ to 0.99 $cm^3/g$, 0.4 $cm^3/g$ to 0.8 $cm^3/g$, or 0.5 $cm^3/g$ to 0.7 $cm^3/g$.

The pore volume of the catalyst includes pores having a pore diameter between 1 Å and 5000 Å and pores having a pore diameter greater than 5000 Å. In some embodiments, the catalyst has a majority of its pore volume in pores having a pore diameter of at most 300 Å, at most 200 Å, or at most 100 Å. In some embodiments, the catalyst has at most 80% of its pore volume in pores having a pore diameter of at most 100 Å, at least 5% of its pore volume in pores having a pore diameter of at between 100 Å and 300 Å, with the balance of the pore volume being in pores having a pore diameter of at least 300 Å.

In some embodiments, the catalyst may have at least 90% or at least 95% of its pore volume in pores having a pore diameter of at most 300 Å.

In some embodiments, the catalyst may have at most 5% of its pore volume in pores having a pore diameter of at least 5000 Å.

Such a catalyst may have a pore volume between 0.5 cc/g and 1.0 cc/g and a surface area of at least 340 m$^2$/g. In some embodiments, the catalyst having a pore size distribution with a median pore diameter in a range from about 50 Å to 100 Å, may have a surface areas of at least 340 m$^2$/g. Such surface area may be in a range from 340 m$^2$/g to 500 m$^2$/g, 350 m$^2$/g to 450 m$^2$/g, or 375 m$^2$/g to 425 m$^2$/g.

Catalysts having specific surface topology, large surface areas, and pore distributions described above may exhibit enhanced run times in commercial applications at low pressures and elevated temperatures. For example, the catalyst remains catalytically active after at least 1 year of run time. The enhanced run times may be attributed to the high surface area of the catalyst and/or the narrow distribution of pore diameter in the pore volume of the catalyst. Thus, the metals of the catalyst remain exposed for longer periods of time and plugging of the pores of the catalyst is minimal. The high surface area and selected distribution of pores in the pore volume of the catalyst allows processing of high viscosity and/or high residue crudes that would not be able to be processed with conventional catalysts having the same pore distribution, but smaller surface area. Calcining a comulled catalyst at temperatures ranging from 315° C. to 675° C., in the range from 400° C. to 650° C., or in the range from 450° C. to 600° C. may facilitate formation of pores having similar pore diameters and narrow pore distributions with large surface areas.

In certain embodiments, the catalyst exists in shaped forms, for example, pellets, cylinders, and/or extrudates. In some embodiments, the catalyst and/or the catalyst precursor is sulfided to form metal sulfides (prior to use) using techniques known in the art (for example, ACTICAT™ process, CRI International, Inc.). In some embodiments, the catalyst may be dried then sulfided. Alternatively, the catalyst may be sulfided in situ by contact of the catalyst with a hydrocarbon feed that includes sulfur-containing compounds. In-situ sulfurization may utilize either gaseous hydrogen sulfide in the presence of hydrogen, or liquid-phase sulfurizing agents such as organosulfur compounds (including alkylsulfides, polysulfides, thiols, and sulfoxides). Ex-situ sulfurization processes are described in U.S. Pat. Nos. 5,468,372 to Seamans et al., and 5,688,736 to Seamans et al., all of which are incorporated herein by reference.

In commercial applications, after sulfidation of the hydroprocessing catalysts, the hydroprocessing catalysts are typically heated to 400° C. over one or more months to control the generation of hydrogen sulfide. Slow heating of hydroprocessing catalysts may inhibit deactivation of the catalyst. The catalyst described herein has enhanced stability in the presence of hydrogen sulfide when heated to 400° C. in less than three weeks. Being able to preheat the catalyst over a shorter period of time may increase the amount of hydrocarbon feed that can be processed through a contacting system.

In certain embodiments, the catalyst of the invention is obtainable by co-mulling Column 6 metal(s) with a support. Co-mulling the Column 6 metal(s) with the support may form a mixture or a substantially homogeneous mixture. In some embodiments, the mixture may be extruded and/or dried. The mixture may be calcined at a temperature of between 535° C. and 700° C. to produce the catalyst.

The support may include from 0.001 grams to 0.2 grams of silica and 0.80 grams to 0.999 grams of alumina, or from 0.001 grams to 0.1 grams of silica and 0.90 gram to 0.999 grams of alumina per gram of catalyst. In some embodiments, the mixture may be dried and calcined at a temperature of between 315° C. and 760° C. to produce the catalyst.

The catalyst may have from 0.001 grams to 0.3 grams, 0.005 grams to 0.2 grams, or 0.01 grams to 0.1 grams of Columns 6 metal(s) per gram of catalyst. In some embodiments, the catalyst may include at most 0.1 grams of Column 6 metal(s) per gram of catalyst.

Without wishing to bound by any kind of theory, it is thought that the addition of silica to the support may allow Columns 6 metal(s) to remain dispersed throughout the support while being heated to elevated temperatures (for example, temperatures of at least 315° C., at least 335° C., at least 375° C., or at least 425° C.).

In some embodiments, the catalyst is monomodal. Such comulling of metal and support, followed by calcination, may produce a monomodal catalyst having a pore size distribution with a median pore diameter of at most 100 Å, with at least 80% of its pore volume in pores having a pore diameter of at most 300 Å. The catalyst may have a surface area of at least 340 m$^2$/g. The catalyst may have a pore volume from 0.5 cc/g to 0.9 cc/g. In some embodiments, the catalyst may exhibit one or more peaks between 35 degrees and 70 degrees, and at least one of the peaks has a base width of at least 10 degrees, as determined by x-ray diffraction at 2-theta.

This catalyst reduces at least a portion of the components that contribute to higher viscosities and/or a portion of the components that contribute to copper content without significant reduction in sulfur and/or Ni/Fe/V content. Treatment of the hydrocarbon feed with a Column 6 metal catalyst that contains none or a minimal amount of Columns 9 and 10 metals may be economically advantageous since it allows production of a product with reduced viscosity and minimal desulfurization and/or demetallation relative to the same properties of the hydrocarbon feed.

Using the catalyst(s) of this application and controlling operating conditions may allow a crude product to be produced that has selected properties changed relative to the hydrocarbon feed while other properties of the hydrocarbon feed are not significantly changed. The resulting crude product may have enhanced properties relative to the hydrocarbon feed and, thus, be more acceptable for transportation and/or refining.

The catalyst of the application may remove components that contribute to a decrease in the life of other catalysts in the system from the hydrocarbon feed. For example, reducing the viscosity of hydrocarbon feed/total product mixture relative to the hydrocarbon feed may inhibit plugging of other catalysts positioned downstream, and thus, increases the length of time the contacting system may be operated without replenishment of catalysts.

The catalyst of the application may produce a crude product with a lower viscosity as compared to the hydrocarbon feed with minimal amount of hydrogen consumption. In some embodiments, at contacting conditions at a total pressure of 3.5 MPa, hydrogen consumption may be at most 30 Nm³/m³, at most 25 Nm³/m³, or at most 10 Nm³/m³. In some embodiments, at contacting conditions at a total pressure of 3.5 MPa, hydrogen consumption may be from 1 Nm³/m³ to 30 Nm³/m³, from 1 Nm³/m³ to 30 Nm³/m³, from 5 Nm³/m³ to 25 Nm³/m³, or from 10 Nm³/m³ to 20 Nm³/m³.

In some embodiments contacting conditions may be controlled to produce the crude product at a partial pressure of hydrogen at a pressure of most 7 MPa, wherein hydrogen consumption is at most 30 Nm³/m³. In other embodiments contacting conditions may be controlled to produce the crude product at a partial pressure of hydrogen at a pressure of most 7 MPa and at a temperature of least 200° C.

In some embodiments, the catalyst of the application may be used in combination with other catalysts. An example of another catalyst is a catalyst that includes supported catalyst fines and/or mineral oxide fines. Such catalysts are described in U.S. patent applications entitled "A Catalyst and Process for the Manufacture of Ultra-Low Sulfur Distillate Product" and "A Highly Stable Heavy Hydrocarbon Hydrodesulfurization Catalyst and Method of Making and Use Thereof" to Bhan; and International Application No. WO 02/32570 to Bhan.

Arrangement of two or more catalysts in a selected sequence may control the sequence of property improvements for the feed. For example, a catalyst having a surface area of at most 300 Å as described herein may be placed upstream of the catalyst having a surface area of at least 340 Å. Treatment of the hydrocarbon feed with hydrogen in the presence of the lower surface area catalyst may reduce a portion of the components that contribute to residue, at least a portion of the components that contribute to high viscosity at least a portion of the $C_5$ asphaltenes, or at least a portion of metals in metal salts of organic acids. Contact of the treated hydrocarbon feed with the higher surface area catalyst may further reduce viscosity, copper content, vanadium content, and/or metals in metal salts of organic acids.

Arrangement and/or selection of the catalysts may, in some embodiments, improve the useable life of the catalysts and/or the stability of the hydrocarbon feed/total product mixture. Improvement of a catalyst life and/or stability of the hydrocarbon feed/total product mixture during processing may allow a contacting system to operate for at least 3 months, at least 6 months, or at least 1 year without replacement of the catalyst in the contacting zone.

Combinations of the catalysts of described herein allows reduction of: viscosity, at least a portion of the $C_5$ asphaltenes, at least a portion of the metals in metal salts of organic acids, at least a portion of the residue, or combinations thereof, from the hydrocarbon feed, before other properties of the hydrocarbon feed are changed, while maintaining the stability of the hydrocarbon feed/total product mixture during processing (for example, maintaining a hydrocarbon feed P-value of above 1.0). The ability to selectively change properties of the hydrocarbon feed may allow the stability of the hydrocarbon feed/total product mixture to be maintained during processing.

In some embodiments, commercially available catalysts may be positioned downstream of the catalysts of the invention to reduce selected properties of the feed. For example, a demetallization catalyst may be positioned downstream of the first catalyst to reduce the Ni/V/Fe content of the crude product as compared to Ni/V/Fe of the feed. A desulfurization catalyst may be positioned downstream of the demetallization catalyst to reduce the heteroatom content of the crude product as compared to the heteroatom content of the feed. Examples of commercial catalysts include HDS3; HDS22; HDN60; C234; C311; C344; C411; C424; C344; C444; C447; C454; C448; C524; C534; DC2531; DN120; DN130; DN140; DN190; DN200; DN800; DN2118; DN2318; DN3100; DN3110; DN3300; DN3310; DN3330; RC400; RC410; RN412; RN400; RN420; RN440; RN450; RN650; RN5210; RN5610; RN5650; RM430; RM5030; Z603; Z623; Z673: Z703; Z713; Z723; Z753; and Z763, which are available from CRI International, Inc. (Houston, Tex., U.S.A.).

Reduction in net hydrogen uptake by the hydrocarbon feed may produce a crude product that has a boiling range distribution similar to the boiling point distribution of the hydrocarbon feed. The atomic H/C ratio of the crude product may also only change by relatively small amounts as compared to the atomic H/C ratio of the hydrocarbon feed.

In some embodiments, catalyst selection and/or order of catalysts in combination with controlled contacting conditions (for example, temperature and/or hydrocarbon feed flow rate) may assist in reducing hydrogen uptake by the hydrocarbon feed, maintaining hydrocarbon feed/total product mixture stability during processing, and changing one or more properties of the crude product relative to the respective properties of the hydrocarbon feed. Stability of the hydrocarbon feed/total product mixture may be affected by various phases separating from the hydrocarbon feed/total product mixture. Phase separation may be caused by, for example, insolubility of the hydrocarbon feed and/or crude product in the hydrocarbon feed/total product mixture, flocculation of asphaltenes from the hydrocarbon feed/total product mixture, precipitation of components from the hydrocarbon feed/total product mixture, or combinations thereof.

At certain times during the contacting period, the concentration of hydrocarbon feed and/or total product in the hydrocarbon feed/total product mixture may change. As the concentration of the total product in the hydrocarbon feed/total product mixture changes due to formation of the crude product, solubility of the components of the hydrocarbon feed and/or components of the total product in the hydrocarbon feed/total product mixture tends to change. For example, the hydrocarbon feed may contain components that are soluble in the hydrocarbon feed at the beginning of processing. As properties of the hydrocarbon feed change (for example, API gravity, viscosity, MCR, $C_5$ asphaltenes, P-value, or combinations thereof), the components may tend to become less soluble in the hydrocarbon feed/total product mixture. In some instances, the hydrocarbon feed and the total product may form two phases and/or become insoluble in one another. Solubility changes may also result in the hydrocarbon feed/total product mixture forming two or more phases. Formation of two phases, through flocculation of asphaltenes, change in concentration of hydrocarbon feed and total product, and/or precipitation of components, tends to reduce the life of one or more of the catalysts. Additionally, the efficiency of the process may be reduced. For example, repeated treatment of the hydrocarbon feed/total product mixture may be necessary to produce a crude product with desired properties.

During processing, the P-value of the hydrocarbon feed/total product mixture may be monitored and the stability of the process, hydrocarbon feed, and/or hydrocarbon feed/total product mixture may be assessed. Typically, a P-value that is at most 1.0 indicates that flocculation of asphaltenes from the hydrocarbon feed generally occurs. If the P-value is initially at least 1.0, and such P-value increases or is relatively stable during contacting, then this indicates that the hydrocarbon feed is relatively stabile during contacting. Hydrocarbon feed/total product mixture stability, as assessed by P-value, may be controlled by controlling contacting conditions, by selection of catalysts, by selective ordering of catalysts, or combinations thereof. Such controlling of contacting conditions may include controlling LHSV, temperature, pressure, hydrogen uptake, hydrocarbon feed flow, or combinations thereof.

The accumulation of sediment and/or insoluble components in the reactor may lead to a pressure change in the contacting zone, thus inhibiting hydrocarbon feed from passing through the contacting zone at desired flow rates. A rapid increase in pressure may indicate plugging of the catalyst. A change in pressure of at least 3 MPa, at least 5 MPa, at least 7 MPa, or at least 10 MPa over a short period of time may indicate catalyst plugging.

During processing, the inlet pressure of a contacting zone of a fixed bed reactor may be monitored. A rapid increase in inlet pressure may indicate that flow through the catalyst is inhibited. The inhibition of flow may be caused by an increase in deposit or sediment formation. The increase in deposit or sediment may plug pores of the catalyst, thus restricting flow of the hydrocarbon feed through the contacting zone.

Typically, hydrocarbon feed having viscosities that inhibit the hydrocarbon feed from being transported and/or pumped are contacted at elevated hydrogen pressures (for example, at least 7 MPa, at least 10 MPa or at least 15 MPa) to produce products that are more fluid. At elevated hydrogen pressures coke formation is inhibited, thus the properties of the hydrocarbon feed may be changed with minimal coke production. Since reduction of viscosity, residue and $C_5/C_7$ asphaltenes is not dependent on hydrogen pressure, reduction of these properties may not occur unless the contacting temperature is at least 300° C. For some hydrocarbon feeds, temperatures of at least 350° C. may be required to reduce desired properties of the hydrocarbon feed to produce a product that meets the desired specifications. At increased temperatures coke formation may occur, even at elevated hydrogen pressures. As the properties of the hydrocarbon feed are changed, the P-value of the hydrocarbon feed/total product may decrease below 1.0 and/or sediment may form, causing the product mixture to become unstable. Since, elevated hydrogen pressures require large amounts of hydrogen, a process capable of reducing properties that are independent of pressure at minimal temperatures is desirable. A process that operates at pressures of at most 7 MPa and temperatures of at least 200° C. without producing sediment and/or coke are advantageous.

During contact, the P-value may be kept above 1.0 by controlling the contacting temperature. For example, in some embodiments, if the temperature increases above 450° C., the P-value drops below 1.0 and the hydrocarbon feed/total product mixture becomes unstable. If the temperature decreases below 370° C., minimal changes to the hydrocarbon feed properties occurs.

The crude product produced by contacting a hydrocarbon feed with one or more catalysts described herein may be useful in a wide range of applications including, but not limited to, use as a feed to refineries, feed for producing transportation fuel, a diluent, or an enhancing agent for underground oil recovery processes. For example, hydrocarbon feeds having an API gravity of at most 10 (for example, bitumen and/or heavy oil/tar sands crude) may be converted into various hydrocarbon streams through a series of processing steps using cracking units (for example, an ebullating bed cracking unit, a fluid catalytic cracking unit, thermal cracking unit, or other units known to convert hydrocarbon feed to lighter components).

Reduction of the viscosity content of a hydrocarbon feed to produce a feed stream that may be processed in units may enhance the processing rate of hydrocarbon feed. A system using the methods and catalysts described herein to change properties of a hydrocarbon feed may be positioned upstream of one or more of the cracking units. Treatment of the hydrocarbon feed in one or more systems described herein may produce a feed that improves the processing rate of the cracking unit by at least a factor of 2, at least a factor of 4, at least a factor of 10, or at least a factor of 100. For example, a system for treating a hydrocarbon feed having a viscosity of at least 100 cSt at 37.8° C. and/or 0.1 grams of residue per gram of hydrocarbon feed may include one or more contacting systems described herein positioned upstream of a cracking unit. The contacting system may include one or more catalysts described herein capable of producing a crude product having a viscosity of at most 50% of the viscosity of the hydrocarbon feed at 37.8° C. and/or at most 90% of the residue of the hydrocarbon feed. The crude product and/or a mixture of the crude product and hydrocarbon feed may enter the cracking unit. Since the crude product and/or mixture of the crude product and hydrocarbon feed has a lower viscosity than the original hydrocarbon feed, the processing rate through the cracking unit may be improved.

In some embodiments, hydrocarbon feeds having at least 0.01 grams of $C_5$ asphaltenes may be deasphalted prior to hydroprocessing treatment in a refinery operation. Deasphalting processes may involve solvent extraction and/or contacting the crude with a catalyst to remove asphaltenes. Reduction of at least a portion of the components that contribute to viscosity, at least a portion of the components that contribute to residue and/or asphaltenes prior to the deasphalting process may eliminate the need for solvent extraction, reduce the amount of required solvent, and/or enhance the efficiency of the deasphalting process. For example, a system for treating a hydrocarbon feed having, per gram of hydrocarbon feed, at least 0.01 grams of $C_5$ asphaltenes and/or 0.1 grams of residue and a viscosity of at least 10 cSt at 37.8° C. may include one or more contacting systems described herein positioned upstream of a deasphalting unit. The contacting system may include one or more catalysts described herein capable of producing a crude product having a $C_5$ asphaltenes content of at most 50% of the hydrocarbon feed $C_5$ asphaltenes content, a residue content of at most 90% of the hydrocarbon feed residue content, a viscosity of at most 50% of the hydrocarbon viscosity or combinations thereof. The crude product and/or a mixture of the crude product and hydrocarbon feed may enter the deasphalting unit. Since the crude product and/or mixture of the crude product and the hydrocarbon feed has a lower asphaltene, residue and/or viscosity than the original hydrocarbon feed, the processing efficiency of the deasphalting unit may be increased by at least 5%, at least 10%, at least 20% or at least 50% of the original efficiency.

EXAMPLES

Non-limiting examples of catalyst preparations and methods of using such catalysts under controlled contacting conditions are set forth below.

Example 1

Preparation of a Column 6 Metal Catalyst Having at Most 10 Wt % Molybdenum and a Surface Area of at Least 340 m²/g A support (4103.4 grams) that contained 0.02 grams of silica and 0.98 grams alumina per gram of support was combined with molybdenum trioxide (409 grams) to form a Mo/support mixture. With a muller mixer running, deionized water (2906.33 grams) was added to the Mo/support mixture and the mixture was mulled until a loss on ignition (after 1 hour at 700° C.) of 58% was obtained. During comulling, the compactness of the powder was monitored every 20 to 30 minutes and 1 wt % (based on loss of ignition) of deionized water was added to the mixture until the loss on ignition value was obtained. The pH of the compact Mo/support powder was 4.63.

The compact Mo/support powder was extruded using 1.3 mm trilobe dies to form 1.3 mm trilobe extrudate particles. The extruded particles were dried at 125° C. and then calcined at 537° C. (1000° F.) for two hours to form the catalyst. The bulk density of the catalyst was 0.547 g/mL. The resulting catalyst contained, per gram of catalyst, 0.08 grams of molybdenum, with the balance being support. The molybdenum catalyst is a monomodal catalyst having a median pore diameter of 81 Å, with at least 60% of the total number of pores in the pore size distribution having a pore diameter within 33 Å of the median pore diameter, a pore volume of 0.633 mL/g, and a surface area of 355 m²/g. The pore distribution as measured by mercury porosimetry at contact angle of 140 is shown in TABLE 1.

TABLE 1

| Pore Diameter in Å | % Pore Volume |
|---|---|
| <70 | 25.61 |
| 70-100 | 57.76 |
| 100-130 | 8.96 |
| 130-150 | 1.50 |
| 150-300 | 4.38 |
| 300-5000 | 2.44 |
| >5000 | 0.47 |

Example 2

Preparation of a Column 6 Metal Catalyst Having at Least 10 wt % Molybdenum and a Surface Area of at Least 340 m²/g A support (3000 grams) that contained 0.02 grams of silica and 0.98 grams alumina per gram of support was combined with molybdenum trioxide (797.84 grams) to form a Mo/support mixture. With a muller running, deionized water (4092.76 grams) was added to the Mo/support mixture, and the mixture was mulled until a loss of ignition of 0.5787 grams per gram of mixture was obtained (for about 45 minutes). The pH of the Mo/support mixture was 3.83.

The Mo/support mixture was extruded using 1.3 mm trilobe dies to form 1.3 trilobe extrudate particles. The particles were dried at 125° C. and then calcined at 537° C. (1000° F.) for two hours. The compacted bulk density of the extrudates was 0.545 g/mL. The resulting catalyst contained, per gram of catalyst, 0.133 grams of molybdenum, with the balance being support. The molybdenum catalyst is a monomodal catalyst having a median pore diameter of 88 Å, with at least 60% of the total number of pores in the pore size distribution having a pore diameter within 47 Å of the median pore diameter, a pore volume of 0.651 mL/g, and a surface area of 365 m²/g. The pore distribution as measured by mercury porosimetry at a contact angle of 140 is shown in TABLE 2.

TABLE 2

| Pore Diameter in Å | % Pore Volume |
|---|---|
| <70 | 23.58 |
| 70-100 | 40.09 |
| 100-130 | 12.77 |

TABLE 2-continued

| Pore Diameter in Å | % Pore Volume |
|---|---|
| 130-150 | 3.02 |
| 150-180 | 2.56 |
| 180-300 | 4.04 |
| 300-1000 | 4.53 |
| 1000-3000 | 5.16 |
| 3000-5000 | 3.19 |
| >5000 | 1.04 |

Figure 2:
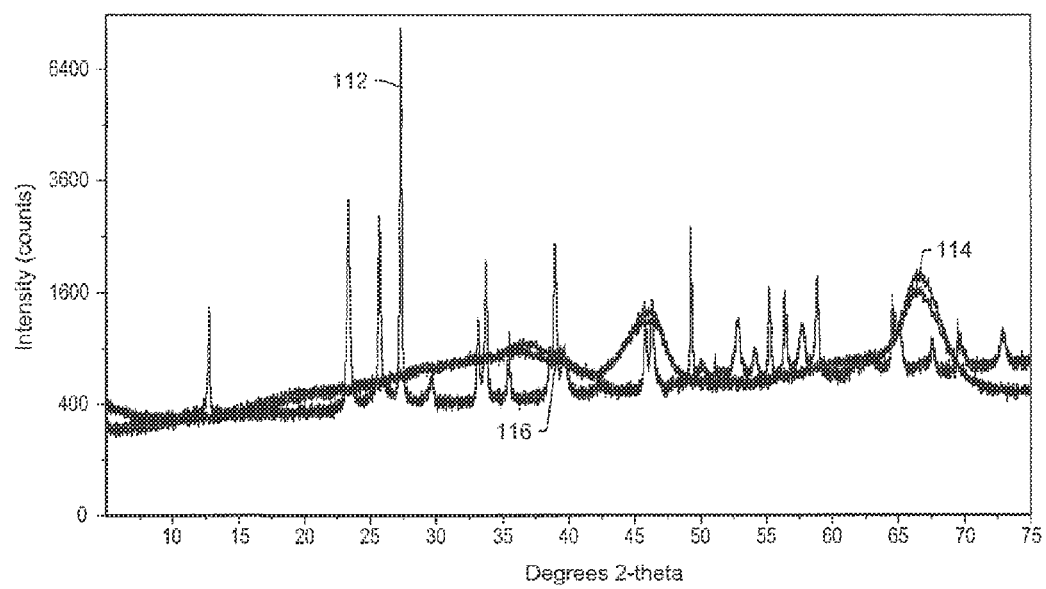
FIG. 2 shows x-ray diffraction plots of intensity versus degrees 2-Theta of molybdenum trioxide and an embodiment of a catalyst.

FIG. 2 shows x-ray diffraction plots of intensity versus degrees 2-Theta of molybdenum trioxide and the catalyst as prepared in Examples 1 and 2. Plot 112 represents the spectrum of molybdenum trioxide. Plot 114 represent the spectrum of the catalyst as prepared in Example 1. Plot 116 represent the spectrum of the catalyst as prepared in Example 2. Peaks between 35 degrees 2-Theta and 70 degree 2-theta have peak widths of about 10 degree 2-theta. Distinct peaks for molybdenum trioxide between 10 degrees 2-theta and 30 degrees 2-theta are absent from plots 114, 116. Plots 114, 116 are similar to the x-ray diffraction pattern for alumina. The change from sharp peaks for molybdenum trioxide (plot 112) to substantially no peaks or broad peaks (plots 114, 116) indicates that the molybdenum metal is moving inside the alumina cavities and cannot be detected by x-ray diffraction techniques.

Examples 1 and 2 demonstrate a method of making a catalyst that includes contacting one or more oxides of one or more Column 6 metals of the Periodic Table with a support, and calcining the one or more Column 6 metal oxides and support at a temperature from 315° C. to 760° C. to provide a calcined catalyst. The support comprises from 0.01 grams to 0.2 gram of silica and from 0.8 grams to 0.99 grams of alumina per gram of support. The calcined catalyst has a surface area of at least 340 m²/g, a pore size distribution with a median pore diameter of at most 100 Å, and at least 80% of its pore volume in pores having a pore diameter of at most 300 Å.

Examples 1 and 2 also demonstrate a catalyst that includes one or more metals from Column 6 of the Periodic Table and/or one or more compounds of one or more metals from Column 6 of the Periodic Table and a support; wherein the support comprises from 0.01 grams to 0.2 grams of silica and from 0.80 grams to 0.99 grams of alumina per gram of support, and wherein the catalyst has a surface area of at least 340 m²/g, a pore size distribution with a median pore diameter of at most 100 Å, and at least 80% of its pore volume in pores having a pore diameter of at most 300 Å.

Example 3

Catalyst Having a Surface Area of at Most 250 m²/g

A comparative catalyst was prepared in the following manner. MoO₃ (94.44 grams) was combined with wide pore alumina (2742.95 grams) and crushed and sieved alumina fines having a particle size between 5 and 10 micrometers (1050.91 grams) in a muller. With the muller running, nitric acid (43.04 grams, 69.7 M) and deionized water (4207.62 grams) were added to the mixture and the resulting mixture was mulled for 5 minutes. Superfloc® 16 (30 grams, Cytec Industries, West Paterson, N.J., USA) was added to the mixture in the muller, and the mixture was mulled for a total of 25 minutes. The resulting mixture had a pH of 6.0 and a loss on ignition of 0.6232 grams per gram of mixture. The mulled mixture was extruded using 1.3 mm trilobe dies to form 1.3 trilobe extrudate particles. The extrudate particles were dried at 125° C. for several hours and then calcined at 676° C. (1250° F.) for two hours to produce the catalyst. The catalyst contained, per gram of catalyst, 0.02 grams of molybdenum, with the balance being mineral oxide and support. The catalyst is a bimodal catalyst having a pore size distribution with a median pore diameter of 117 Å with 60% of the total number of pores in the pore size distribution having a pore diameter within 33 Å of the median pore diameter, a total pore volume of 0.924 cc/g, and a surface area of 249 m²/g.

The pore size distribution measured using mercury porosimetry at a contact angle of 140 is shown in TABLE 3.

TABLE 3

| Pore Diameter in Å | % Pore Volume |
|---|---|
| <70 | 0.91 |
| 70-100 | 20.49 |
| 100-130 | 37.09 |
| 130-150 | 4.51 |
| 150-180 | 2.9 |
| 180-200 | 1.06 |
| 200-1000 | 0.85 |
| 1000-5000 | 5.79 |
| >5000 | 22.04 |

Example 4

Contact of a Hydrocarbon Feed with Catalysts from Examples 1 and 3

A tubular reactor with a centrally positioned thermowell was equipped with thermocouples to measure temperatures throughout a catalyst bed. The catalyst bed was formed by filling the space between the thermowell and an inner wall of the reactor with catalysts and silicon carbide (20-grid, Stanford Materials; Aliso Viejo, Calif.). Such silicon carbide is believed to have low, if any, catalytic properties under the process conditions described herein. All catalysts were blended with an equal volume amount of silicon carbide before placing the mixture into the contacting zone portions of the reactor.

The hydrocarbon feed flow to the reactor was from the top of the reactor to the bottom of the reactor. Silicon carbide was positioned at the bottom of the reactor to serve as a bottom support.

A volume of Column 6 metal catalyst (24 cm³) as described in Example 1 was mixed with silicone carbide (24 cm³) and the mixture was positioned in the bottom contacting zone.

A Column 6 metal catalyst (6 cm³) as described in Example 3 was mixed with silicon carbide (6 cm³) and the mixture was positioned on top of the contacting zone to form a top contacting zone.

The catalysts were sulfided by introducing a gaseous mixture of 5 vol % hydrogen sulfide and 95 vol % hydrogen gas into the contacting zones at a rate of 1.5 liters/hour of gaseous mixture per volume (mL) of total catalyst (silicon carbide was not counted as part of the volume of catalyst). Temperatures of the contacting zones were increased to 204° C. (400° F.) over 1 hour and held at 204° C. for 2 hours. After holding at 204° C., the temperature of the contacting zones was increased incrementally to 316° C. (600° F.) at a rate of 10° C. (50° F.) per hour. The contacting zones were maintained at 316° C. for an hour, then the temperature was raised to 370° C. (700° F.) over 1 hour and held at 370° C. for two hours. The contacting zones were allowed to cool to ambient temperature.

After sulfidation of the catalysts, the temperature of the contacting zones was raised to a temperature of 410° C. A hydrocarbon feed (Peace River), having the properties listed in Table 4 was flowed through the preheat zone, top contacting zone, bottom contacting zone, and bottom support of the reactor. The hydrocarbon feed was contacted with each of the catalysts in the presence of hydrogen gas. Contacting conditions were as follows: ratio of hydrogen gas to feed was 318 Nm³/m³ (2000 SCFB) and LHSV was about 0.5 h⁻¹. The two contacting zones were heated to 400° C. and maintained between 400° C. and 420° C. at a system pressure of 3.5 MPa (500 psig) as the hydrocarbon feed flowed through the reactor for a period of time (about 9722 hours). During the run, an increase in inlet pressure from about 3.5 MPa and about 7 MPa was observed at about 6500 hours and 9000 hours. Although the pressure increased during this time, the pressure stabilized at about 7 MPa. Since a rapid increase in pressure was not observed the run was allowed to continue. The P-Value was monitored periodically and remained at 1.0 or above 1.0, therefore the process was considered stable. For example, at 7896 hours the P-Value was 1.0 and the inlet pressure was about 7.1 MPa (1012 psig). At about 9000 hours, the inlet pressure dropped to below 7 MPa.

As shown in Table 4, the crude product had a viscosity of 79.5 at 37.8° C., a residue content of 0.278 grams, per gram of crude product, a Ni/V/Fe content of 252.6 wtppm, a molybdenum content of 0.4 wtppm, and a MCR content of 10.4.

This example demonstrates a method for contacting a hydrocarbon feed with one or more catalysts to produce a total product that includes the crude product. At least one of the catalysts comprises one or more metals from Column 6 of the Periodic Table and/or one or more compounds of one or more metals from Column 6 of the Periodic Table and a support. The support comprises from 0.01 grams to 0.2 gram of silica and from 0.80 grams to 0.99 grams of alumina per gram of support. The Column 6 metal catalyst has a surface area of at least 340 m²/g, a pore size distribution with a median pore diameter of at most 100 Å, and at least 80% of its pore volume in pores having a pore diameter of at most 300 Å.

This example also demonstrates a method for contacting a hydrocarbon feed with one or more catalyst to produce a total product that includes the crude product. At least one of the catalysts comprises one or more metals from Column 6 of the Periodic Table and/or one or more compounds of one or more metals from Column 6 of the Periodic Table and a support. The support comprises from 0.01 grams to 0.2 gram of silica and from 0.80 grams to 0.99 grams of alumina per gram of support. The catalyst exhibits one or more peaks between 35 degrees and 70 degrees, and at least one of the peaks has a base width of at least 10 degrees, as determined by x-ray diffraction at 2-theta.

Example 5

Contact of a Hydrocarbon Feed Catalysts from Examples 2 and 3

The apparatus, sulfiding of catalyst, hydrocarbon feed and operating conditions were the same as for Example 4, with the exception of the catalysts.

A volume of Column 6 metal catalyst (24 cm³) as described in Example 2 was mixed with silicone carbide (24 cm³) and the mixture positioned in the bottom contacting zone.

A Column 6 metal catalyst (6 cm³) as described in Example 3 was mixed with silicon carbide (6 cm³) and the mixture positioned on top of the contacting zone to form a top contacting zone.

During the run, a rapid increase in inlet pressure from about 3.5 MPa and about 10.4 MPa was observed at about 6500 hours. Since the pressure did not stabilize, the run was stopped.

As shown in Table 4, the crude product had a viscosity of 86.4 at 37.8° C., a residue content of 0.264 grams, per gram of crude product, a Ni/V/Fe content of 251.6 wtppm, a molybdenum content of 0.4 wtppm, and a MCR content of 10.6.

This example demonstrates that a method for contacting a hydrocarbon feed with one or more catalysts to produce a total product that includes the crude product. At least one of the catalysts comprises one or more metals from Column 6 of the Periodic Table and/or one or more compounds of one or more metals from Column 6 of the Periodic Table and a support. The support has from 0.01 grams to 0.2 gram of silica and from 0.80 grams to 0.99 grams of alumina per gram of support. The Column 6 metal catalyst has a surface area of at least 340 $m^2$/g, a pore size distribution with a median pore diameter of at most 100 Å, and at least 80% of its pore volume in pores having a pore diameter of at most 300 Å.

This example also demonstrates a method for contacting a hydrocarbon feed with one or more catalyst to produce a total product that includes the crude product. At least one of the catalysts comprises one or more metals from Column 6 of the Periodic Table and/or one or more compounds of one or more metals from Column 6 of the Periodic Table and a support. The support comprises from 0.01 grams to 0.2 gram of silica and from 0.80 grams to 0.99 grams of alumina per gram of support. The catalyst exhibits one or more peaks between 35 degrees and 70 degrees, and at least one of the peaks has a base width of at least 10 degrees, as determined by x-ray diffraction at 2-theta.

Figure 3:
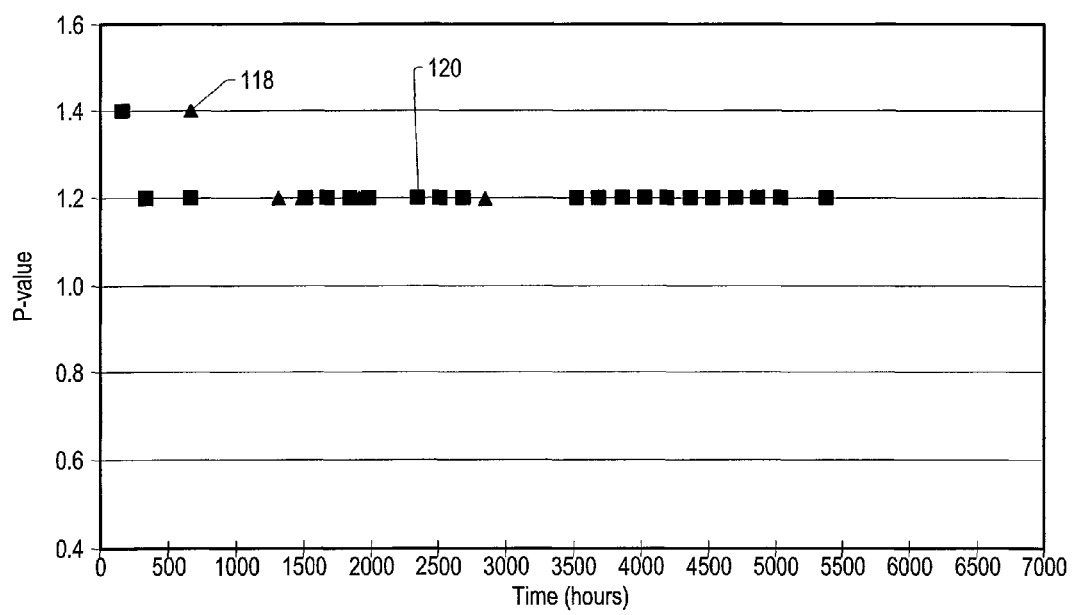
FIG. 3 is a graphical representation of a P-value of a crude product versus run time for various catalysts.

FIG. 3 is a graphical representation of P-value of the crude product versus run time for each of the catalyst systems of Examples 4 and 5. The hydrocarbon feed had a P-value of at least 1.2. Plots 118 and 120 represent the P-value of the crude product obtained by contacting the hydrocarbon feed with the three catalyst systems of Examples 4 and 5 respectively. From the P-value of the crude product for each trial, it may be inferred that the hydrocarbon feed in each trial remained relatively stable during contacting (for example, the hydrocarbon feed did not separate into separate phases). As shown in FIG. 3, the P-value of the crude product remained relatively constant during significant portions of each trial.

Example 6

Comparative Example

The apparatus, sulfiding of catalyst, hydrocarbon feed and operating conditions were the same as for Example 4, with the exception of the catalysts.

A volume of Column 6 metal catalyst (24 $cm^3$) as described in Example 3 was mixed with silicone carbide (24 $cm^3$) and the mixture was positioned in the bottom contacting zone.

A Column 6 metal catalyst (6 $cm^3$) as described in Example 3 was mixed with silicone carbide (6 $cm^3$) and the mixture was positioned on top of the contacting zone to form a top contacting zone.

Silicon carbide was positioned on top of the top contacting zone to fill dead space and to serve as a preheat zone. The catalyst bed was loaded into a Lindberg furnace that included four heating zones corresponding to the preheat zone, the top and bottom contacting zones, and the bottom support.

During the run, a increase in inlet pressure from about 3.5 MPa and about 5 MPa was observed at about 5543 hours.

As shown in Table 4, the crude product had a viscosity of 101 at 37.8° C., a residue content of 0.273 grams, per gram of crude product, a Ni/V/Fe content of 255.2 wtppm, a molybdenum content of 0.6 wtppm, and a MCR content of 10.6.

In comparing Examples 4 and 5 with the comparative Examples, the crude products have similar values for all the Examples. The crude products produced in Examples 4 and 5 have lower values for viscosity and hydrogen consumption as compared to the respective values for the crude product produced in the comparative example. As such, it may be concluded that contact of the hydrocarbon feed with hydrogen in the presence of the catalyst prepared as described in Examples 1 and 2 may reduce viscosity of the hydrocarbon feed more than contact of the hydrocarbon feed with hydrogen in the presence of the catalyst prepared as described in Example 3.

Example 7

Comparative Example

The hydrocarbon feed, contacting conditions, and sulfidation were the same as Example 4.

A commercial bimodal molybdenum/nickel catalyst (RM 5030, Criterion Catalysts & Technologies, Houston, Tex., 24 $cm^3$) having a molybdenum content of about 5 wt %, a surface area of about 255 $m^2$/g and having a bimodal pore size distribution with a medium pore diameter of about 117 Å used for upgrading residue was prepared mixed with silicone carbide (30 $cm^3$ for a total catalyst/silicone carbide mixture of 54 $cm^3$) was positioned in the contacting zone. The run was terminated at 1872 hours due to a rapid increase in pressure change (inlet pressure of greater than 13 MPa (about 1872 psig) and rising. Rapid increase in inlet pressure was attributed to catalyst plugging.

Figure 4:
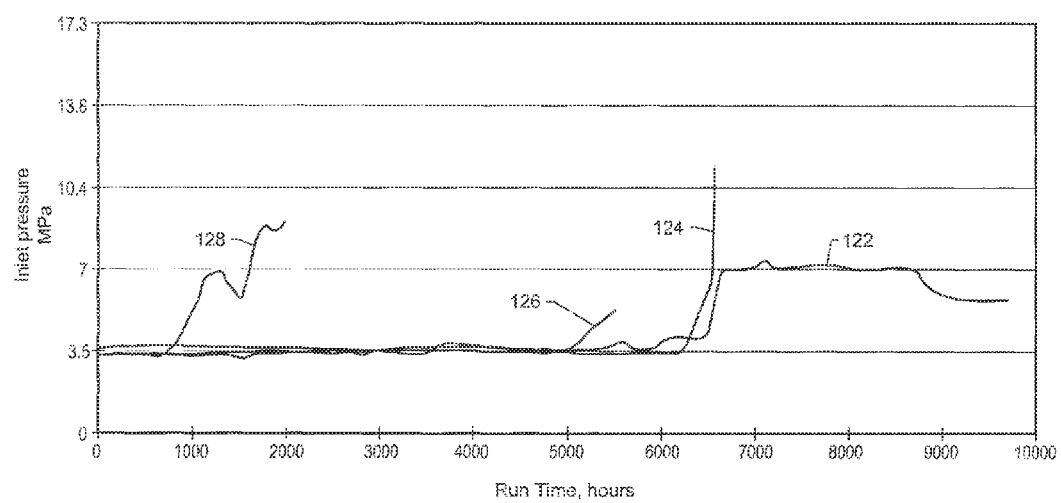
FIG. 4 is a graphical representation of inlet pressure of the reactor verus run time for various catalysts.

FIG. 4 is a graphical representation of inlet pressure of the reactor verus run time for catalysts in Examples 4-7, including the two examples of the process of the present invention and the two comparative examples. Data 122 represents Example 4, data 124 represents Example 5, data 126 represents Example 6, and data 128 represents Example 7. Although, an increase in pressure was observed at about 6500 hours for Example 4 (data 118), the pressure become substantially constant at about 7 MPa and viscosity reduction in addition to other properties of the crude product were still modified as compared to the hydrocarbon feed properties. No rapid increase in pressure was observed for this catalyst.

Example 5 showed a rapid increase in pressure at about 6500 hours. In comparing Examples 4 and 5, the catalyst of Example 4 was observed to change properties of the hydrocarbon feed for longer periods of time than the catalyst of Example 5. The longer run time may be attributed to the catalyst of Example 4 having less metal (less than 0.1 grams of Column 6 metal per gram of catalyst) as compared to the catalyst of Example 5.

In comparing Examples 4 and 5 with the comparative examples (Example 6 and Example 7) the crude products have similar values for all the Examples. The catalyst life for Examples 4 and 5 is significantly longer than the catalyst life for the comparative examples. As such, it may be concluded that the contact of the hydrocarbon feed with hydrogen in the presence of the monomodal catalyst prepared as described in Examples 1 and 2 may be done at low pressures and high temperatures for longer periods of time than the comparative catalysts at the same temperatures and pressures.

TABLE 4

| Property | Hydrocarbon Feed | Crude Product Example 4 | Crude Product Example 4 | Crude Product Example 5 | Comparative Example 6 | Comparative Example 7 |
|---|---|---|---|---|---|---|
| Contact Time, hours | | 4200 | 8520 | 6536 | 5543 | 1872 |
| Temperature, ° C. | | 410 | 410 | 410 | 410 | 410 |
| Pressure, MPa | | 3.5 | 7 | 3.5 | 3.5 | 3.5 |
| API Gravity | 7.9 | 14.3 | * | 13.5 | 13.5 | 15.8 |
| Density at 15.56° C. (60° F.), g/cm³ | 1.0149 | 0.9704 | * | 0.9785 | 0.9785 | 0.9608 |
| Hydrogen, wt % | 10.109 | 10.432 | 10.720 | 10.485 | 10.403 | 10.617 |
| Carbon, wt % | 81.987 | 84.174 | 84.450 | 83.72 | 84.513 | 84.617 |
| Sulfur, wt % | 6.687 | 4.387 | 3.714 | 5.064 | 4.487 | 3.782 |
| Nitrogen, wt % | 0.366 | 0.399 | 0.371 | 0.397 | 0.397 | 0.385 |
| Nickel, wtppm | 70 | 63 | 32 | 63 | 55 | 56 |
| Iron, wtppm | 2.4 | 0.6 | 0.2 | 0.4 | 0.2 | 0.2 |
| Vanadium, wtppm | 205 | 189 | 100 | 197 | 151 | 152 |
| Calcium, wtppm | 6.7 | 5.9 | 0.3 | 0.7 | 1.9 | 2.1 |
| Copper, wtppm | 0.9 | 0.2 | 0.2 | 0.4 | 0.9 | 0.2 |
| Chromium, wtppm | 0.3 | 0.2 | 0.2 | 0.2 | 0.2 | 0.2 |
| Silicon, wtppm | 1.2 | 0.8 | 0.4 | 0.3 | 0.3 | 0.3 |
| Magnesium, wtppm | 0.8 | 0.7 | 0.2 | 0.6 | 0.2 | 0.4 |
| Zinc, wtppm | 6.0 | 1.0 | 0.6 | 2.0 | 1.4 | 1.7 |
| Molybdenum, wtppm | 6.6 | 0.4 | 1.9 | 1.9 | 0.3 | 0.8 |
| Micro-Carbon Residue, wt % | 12.5 | 10.4 | 8.6 | 10.8 | 10.3 | 9.6 |
| $C_5$ Asphaltenes, wt % | 16.2 | 9 | 6.6 | 8.5 | 8.5 | 8.0 |
| $C_7$ Asphaltenes, wt % | 10.9 | 5.9 | 4.6 | 6.5 | 5.9 | 5.1 |
| Naphtha., wt % | | 4.2 | 8.0 | 3.6 | 0.9 | 5.1 |
| Distillate, wt % | 15.0 | 28.1 | 30.9 | 25.6 | 31.8 | 30.7 |
| VGO, wt % | 37.5 | 39.9 | 38.1 | 42.5 | 44.5 | 39.8 |
| Residue, wt % | 47.4 | 27.8 | 23.0 | 28.9 | 22.8 | 24.4 |
| P-Value | 2.6 | 1.2 | * | 1.2 | 0.9 | 1.0 |
| Viscosity at 37.8° C. (100° F.), cSt | 8357 | 79.5 | 25.9 | 115 | 89.4 | 51.4 |
| Hydrogen Consumption, Nm³/m³ | | 29.41 | 61.18 | 36.24 | 21.6 | * |
| Inlet pressure | | 3.78 | 7.2 | 8.7 | 3.6 | 8.2 |

* Not Determined

What is claimed is:

1. A method of producing a crude product, comprising: contacting a hydrocarbon feed with one or more catalysts to produce a total product that includes the crude product, wherein at least one of the catalysts comprises one or more metals from Column 6 of the Periodic Table and/or one or more compounds of one or more metals from Column 6 of the Periodic Table and a support; wherein the support comprises from 0.01 grams to 0.2 grams of silica and from 0.80 grams to 0.99 grams of alumina per gram of support, and wherein the Column 6 metal catalyst has a surface area of at least 340 m²/g, a pore size distribution with a median pore diameter of at most 100 Å, and at least 80% of its pore volume in pores having a pore diameter of at most 300 Å; and
wherein surface area is as determined by ASTM Method D3663 and pore diameters and pore volumes are as measured by ASTM Method D4284.

2. A method of producing a crude product, comprising: contacting a hydrocarbon feed with one or more catalysts for at least 500 hours at a temperature of at least 200° C. and a pressure of at least 3.5 MPa to produce a total product that includes the crude product, wherein at least one of the catalysts comprises one or more metals from Column 6 of the Periodic Table and/or one or more compounds of one or more metals from Column 6 of the Periodic Table and a support; wherein the support comprises from 0.01 grams to 0.2 grams of silica and from 0.80 grams to 0.99 grams of alumina per gram of support, and wherein the Column 6 metal catalyst exhibits one or more peaks between 35 degrees and 70 degrees, and at least one of the peaks has a base width of at least 10 degrees, as determined by x-ray diffraction at 2-theta.

3. The method as claimed in any of claim 1 or 2, wherein the crude product is a liquid mixture at 25° C. and 0.101 MPa.

4. The method as claimed in any of claim 1 or 2, wherein the method further comprises fractionating the crude product into one or more distillate fractions, and producing transportation fuel from at least one of the distillate fractions.

5. The method as claimed in any of claim 1 or 2, wherein contacting is done in the presence of a hydrogen source.

6. The method as claimed in any of claim 1 or 2, wherein contacting is for at least 1000, at least 3000 or at least 6000 hours.

7. A crude product produced by the methods as claimed in any of claim 1 or 2.

* * * * *